US009307507B2

(12) United States Patent
Zhou et al.

(10) Patent No.: US 9,307,507 B2
(45) Date of Patent: Apr. 5, 2016

(54) SYSTEMS AND METHODS OF SELECTIVE SCANNING FOR AD-HOC NETWORKS

(71) Applicant: Qualcomm Incorporated, San Diego, CA (US)

(72) Inventors: Yan Zhou, San Diego, CA (US); George Cherian, San Diego, CA (US); Santosh Paul Abraham, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 299 days.

(21) Appl. No.: 13/836,178

(22) Filed: Mar. 15, 2013

(65) Prior Publication Data
US 2014/0153444 A1 Jun. 5, 2014

Related U.S. Application Data

(60) Provisional application No. 61/732,050, filed on Nov. 30, 2012, provisional application No. 61/732,043, filed on Nov. 30, 2012.

(51) Int. Cl.
*H04W 84/18* (2009.01)
*H04W 56/00* (2009.01)
(Continued)

(52) U.S. Cl.
CPC .......... *H04W 56/0015* (2013.01); *H04L 45/28* (2013.01); *H04W 40/005* (2013.01);
(Continued)

(58) Field of Classification Search
USPC ........................................................ 370/256
See application file for complete search history.

(56) References Cited

U.S. PATENT DOCUMENTS 7,848,278 B2   12/2010   Chen et al.
7,873,343 B2   1/2011    Gollnick et al.
(Continued)

FOREIGN PATENT DOCUMENTS

CN   101895419 A   11/2010
EP   1487155 A2   12/2004
(Continued)

OTHER PUBLICATIONS

International Search Report and Written Opinion—PCT/US2013/070819—ISA/EPO—Jun. 30, 2014.
(Continued)

*Primary Examiner* — Edan Orgad
*Assistant Examiner* — Emmanuel Maglo
(74) *Attorney, Agent, or Firm* — S. Hossain Beladi

(57) ABSTRACT

Methods, devices, and computer program products for selective scanning of ad-hoc networks are described herein. In one aspect, a method includes receiving a message identifying a number of times the message has been forwarded. The method further includes selectively scanning for other ad-hoc networks based on the identified number. In one aspect, a root device for an ad-hoc network is responsible for generating synchronization messages for nodes of the ad-hoc network. The synchronization message includes a count of the number of times the synchronization message has been forwarded. When the hop count reaches a limit, the synchronization message is no longer retransmitted or forwarded by receiving nodes. Nodes receiving this message may recognize they are positioned near the edge of the ad-hoc network. In at least one embodiment, these nodes may selectively scan for other ad-hoc networks based on the hop count reaching or exceeding a predetermined threshold.

66 Claims, 16 Drawing Sheets

(51) Int. Cl.
*H04W 40/00* (2009.01)
*H04W 40/20* (2009.01)
*H04W 40/22* (2009.01)
*H04W 40/24* (2009.01)
*H04W 84/20* (2009.01)
*H04W 40/12* (2009.01)
*H04L 12/703* (2013.01)

(52) U.S. Cl.
CPC ............. *H04W40/12* (2013.01); *H04W 40/20* (2013.01); *H04W 40/22* (2013.01); *H04W 40/246* (2013.01); *H04W 84/18* (2013.01); *H04W 84/20* (2013.01)

(56) References Cited

U.S. PATENT DOCUMENTS

| | | | |
|---|---|---|---|
| 8,060,089 B1* | 11/2011 | Bhan | H04W 60/02 340/7.22 |
| 8,335,511 B2* | 12/2012 | Singh et al. | 455/445 |
| 8,339,991 B2 | 12/2012 | Biswas et al. | |
| 2002/0013856 A1* | 1/2002 | Garcia-Luna-Aceves et al. | 709/238 |
| 2004/0023651 A1 | 2/2004 | Gollnick et al. | |
| 2004/0233855 A1* | 11/2004 | Gutierrez et al. | 370/252 |
| 2005/0086273 A1 | 4/2005 | Loebbert et al. | |
| 2006/0052125 A1* | 3/2006 | Falck et al. | 455/517 |
| 2006/0142034 A1* | 6/2006 | Wentink et al. | 455/515 |
| 2006/0198346 A1* | 9/2006 | Liu | H04W 40/24 370/338 |
| 2007/0008947 A1 | 1/2007 | Belcea | |
| 2007/0201382 A1 | 8/2007 | Ekl et al. | |
| 2007/0217406 A1* | 9/2007 | Riedel et al. | 370/389 |
| 2008/0232344 A1* | 9/2008 | Basu et al. | 370/350 |
| 2009/0313310 A1 | 12/2009 | Thome et al. | |
| 2009/0323644 A1* | 12/2009 | Yokota | 370/338 |
| 2010/0254309 A1* | 10/2010 | Mankins et al. | 370/328 |
| 2011/0128905 A1 | 6/2011 | Kawauchi et al. | |
| 2012/0201167 A1 | 8/2012 | Chen et al. | |
| 2013/0021896 A1 | 1/2013 | Pu et al. | |
| 2013/0132502 A1 | 5/2013 | Stacey et al. | |
| 2013/0185373 A1 | 7/2013 | Vandwalle et al. | |
| 2014/0153440 A1 | 6/2014 | Zhou et al. | |

FOREIGN PATENT DOCUMENTS

| | | |
|---|---|---|
| EP | 1548985 A1 | 6/2005 |
| EP | 2337277 A1 | 6/2011 |
| WO | 0074402 A1 | 12/2000 |
| WO | 02060134 | 8/2002 |
| WO | 2008027294 A2 | 3/2008 |
| WO | 2008085660 A1 | 7/2008 |
| WO | 2009135061 A1 | 11/2009 |

OTHER PUBLICATIONS

IEEE Standard for Local and metropolitan area networks, Part 15.4: Low-Rate Wireless Personal Area Networks (LR-WPANs), IEEE Std 802.15.4™ 2011, Revision of IEEE Std 802.15.4-2006, Sep. 5, 2011, pp. 1-314.

Lee B.J., et al., "Source-based Multiple Gateway Selection Routing Protocol in Ad-hoc Networks," ICACT, Feb. 20-22, 2006, pp. 2159-2163.

Sun N., et al., "Node Classification Based on Functionality in Energy-Efficient and Reliable Wireless Sensor Networks," Hindawi Publishing Corporation, International Journal of Distributed Sensor Networks, vol. 2012, Article ID 937462, pp. 1-12.

* cited by examiner

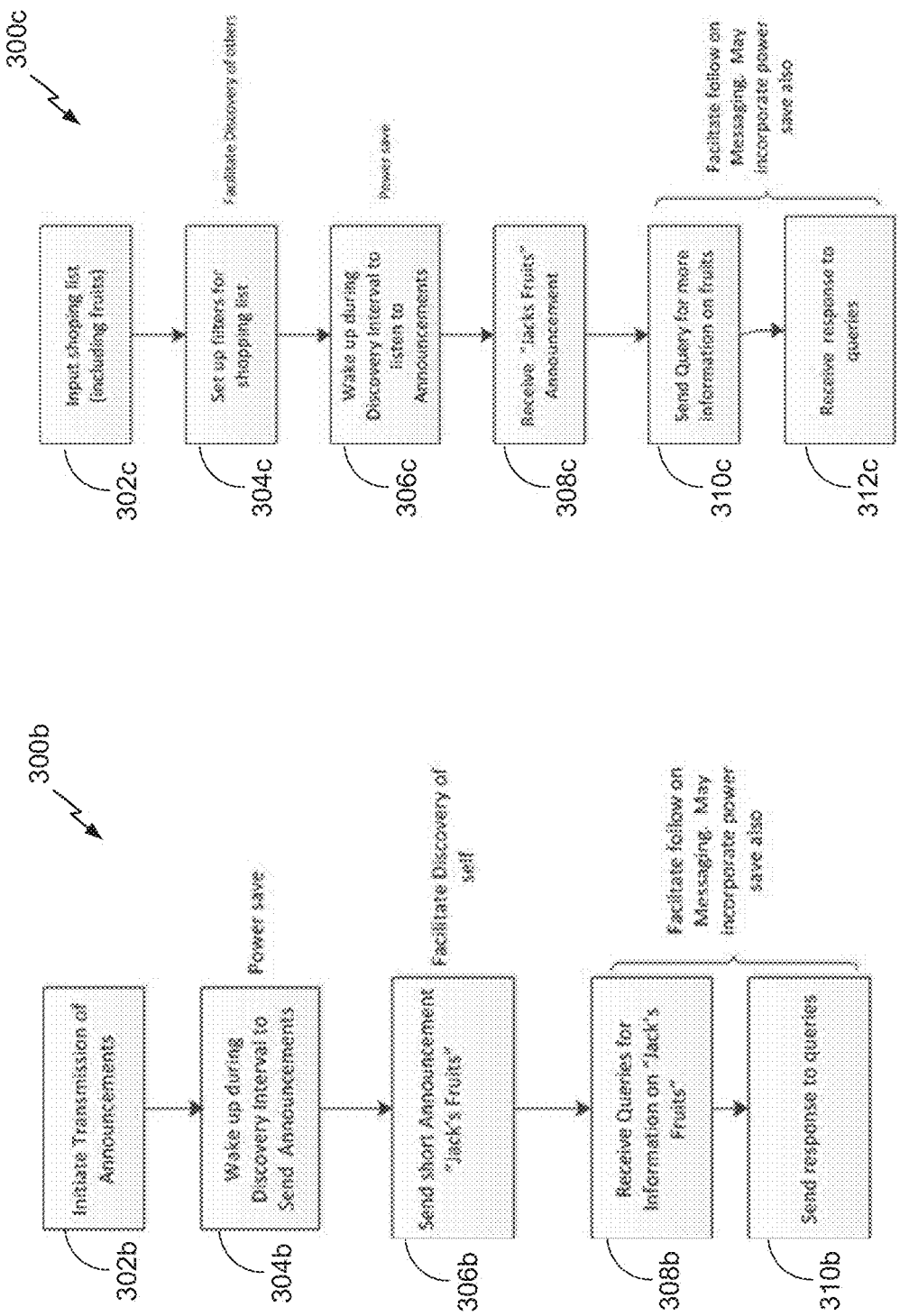

SYSTEMS AND METHODS OF SELECTIVE SCANNING FOR AD-HOC NETWORKS

CROSS REFERENCE TO RELATED APPLICATIONS

This application claims the benefit of U.S. Provisional Application 61/732,050, filed Nov. 30, 2012, and entitled "SYSTEMS AND METHODS FOR SYNCHRONIZATION OF WIRELESS DEVICES IN AN AD-HOC NETWORK," and U.S. Provisional Application 61/732,043, filed Nov. 30, 2012, and entitled "SYSTEMS AND METHODS OF SELECTIVE SCANNING FOR AD-HOC NETWORKS." The disclosures of these two applications are hereby incorporated by reference in their entirety. This application is related to U.S. application Ser. No. 13/835,788, titled "SYSTEMS AND METHODS FOR SYNCHRONIZATION OF WIRELESS DEVICES IN AN AD-HOC NETWORK," filed on even date herewith, and is incorporated herein by reference, in its entirely.

BACKGROUND

1. Field

The present application relates generally to wireless communications, and more specifically to systems, methods, and devices for selective scanning for ad-hoc wireless networks.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network may transmit and/or receive information to and from each other. To carry out various communications, the devices may need to coordinate according to a protocol. As such, devices may exchange information to coordinate their activities Improved systems, methods, and devices for coordinating transmitting and sending communications within a wireless network are desired.

FIG. 1a illustrates an example of a prior art wireless communication system 100. The wireless communication system 100 may operate pursuant to a wireless standard, such as an 802.11 standard. The wireless communication system 100 may include an AP 104, which communicates with STAs. In some aspects, the wireless communication system 100 may include more than one AP. Additionally, the STAs may communicate with other STAs. As an example, a first STA 106a may communicate with a second STA 106b. As another example, a first STA 106a may communicate with a third STA 106c although this communication link is not illustrated in FIG. 1a.

A variety of processes and methods may be used for transmissions in the wireless communication system 100 between the AP 104 and the STAs and between an individual STA, such as the first STA 106a, and another individual STA, such as the second STA 106b. For example, signals may be sent and received in accordance with OFDM/OFDMA techniques. If this is the case, the wireless communication system 100 may be referred to as an OFDM/OFDMA system. Alternatively, signals may be sent and received between the AP 104 and the STAs and between an individual STA, such as the first STA 106a, and another individual STA, such as the second STA 106b, in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel.

A communication link may be established between STAs. Some possible communication links between STAs are illustrated in FIG. 1a. As an example, a communication link 112 may facilitate transmission from the first STA 106a to the second STA 106b. Another communication link 114 may facilitate transmission from the second STA 106b to the first STA 106a.

The AP 104 may function as a base station and provide wireless communication coverage in a basic service area (BSA) 102. The AP 104 along with the STAs associated with the AP 104 and that use the AP 104 for communication may be referred to as a basic service set (BSS).

It should be noted that the wireless communication system 100 may not have a central AP 104, but rather may function as an ad-hoc network between the STAs. Accordingly, the functions of the AP 104 described herein may alternatively be performed by one or more of the STAs.

FIG. 1b illustrates an example of a prior art wireless communication system 160 that may function as an ad-hoc network. For example, the wireless communication system 160 shown in FIG. 1b shows STAs 106a-i that may communicate with each other without the presence of an AP. As such, the STAs, 106a-i may be configured to communicate in different ways to coordinate transmission and reception of messages to prevent interference and accomplish various tasks. In one aspect, the networks shown in FIG. 1b may configured as a "near-me are network" (NAN). In one aspect, a NAN may refer to a network for communication between STAs that are located in close proximity to each other. In some cases the STAs operating within the NAN may belong to different network structures (e.g., STAs in different homes or buildings as part of independent LANs with different external network connections).

In some aspects, a communication protocol used for communication between nodes on the ad-hoc communications network 160 may schedule periods of time during which communication between network nodes may occur. These periods of time when communication occurs between STAs a-i may be known as availability windows. An availability window may include a discovery interval or paging interval as discussed further below.

The protocol may also define other periods of time when no communication between nodes of the network is to occur. In some embodiments, nodes may enter one or more sleep states when the ad-hoc network 160 is not in an availability window. Alternatively, in some embodiments, portions of the stations 106a-i may enter a sleep state when the ad-hoc network is not in an availability window. For example, some stations may include networking hardware that enters a sleep state when the ad-hoc network is not in an availability window, while other hardware included in the STA, for example, a processor, an electronic display, or the like do not enter a sleep state when the ad-hoc network is not in an availability window.

The ad-hoc communication network 160 may assign one node to be a root node. In FIG. 1b, the assigned root node is shown as STA 106e. In ad-hoc network 160, the root node is responsible for periodically transmitting synchronization signals to other nodes in the ad-hoc network. The synchronization signals transmitted by root node 160e may provide a timing reference for other nodes 106a-d and 106f-i to coordinate an availability window during which communication occurs between the nodes. For example, a synchronization message 172a-d may be transmitted by root node 106e and received by nodes 106b-c and 106f-g. The synchronization message 172 may provide a timing source for the STAs 106b-c and 106f-g. The synchronization message 172 may also provide updates to a schedule for future availability windows. The synchronization messages 172 may also function to notify STAs 106b-c and 106f-g that they are still present in the ad-hoc network 160.

One or more of the nodes in the ad-hoc communication network 160 may function as branch synchronization nodes. A branch synchronization node may retransmit both availability window schedule and master clock information received from a root node. In some embodiments, synchronization messages transmitted by a root node may include availability window schedule and master clock information. In these embodiments, the synchronization messages may be retransmitted by the branch synchronization nodes. In FIG. 1b, STAs 106b-c and 106f-g are shown functioning as branch-synchronization nodes in the ad-hoc communication network 160. STAs 106b-c and 106f-g receive the synchronization message 172a-d from root node 106e and retransmit the synchronization message as retransmitted synchronization messages 174a-d. By retransmitting the synchronization message 172 from root node 106e, the branch synchronization nodes 106b-c and 106f-g may extend the range and improve the robustness of the ad-hoc network 160.

The retransmitted synchronization messages 174a-d are received by nodes 106a, 106d, 106h, and 106i. These nodes may be characterized as "leaf" nodes, in that they do not retransmit the synchronization message they receive from either the root node 106e or the branch synchronization nodes 106b-c or 106f-g.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the disclosure provides a method for wireless communication by a leaf device in an ad-hoc communications network. The method includes receiving a message identifying a number of times the message has been forwarded, and selectively scanning for other ad-hoc networks based on the identified number. In some embodiments, the selective scanning is performed if the identified number is greater than or equal to a maximum number of hops. In some embodiments, the method also includes incrementing the number of times the received message has been forwarded and forwarding the received message if the identified number is less than a maximum number of hops. In some embodiments, the method includes not forwarding the message if the identified number is greater than or equal to a maximum number of hops. In some embodiments, the method includes joining a second ad-hoc network based on the selective scanning. In some embodiments, the device is a leaf device of the ad-hoc network if the identified number of times is greater than or equal to a maximum number of hops. In some embodiments, the received message comprises a synchronization message sent from a root device. In some embodiments, the method includes configuring whether to selectively scan based on the identified number. In some embodiments, selectively scanning for other ad-hoc networks includes receiving messages outside an availability window for the ad-hoc communications network. In some of these embodiments, selectively scanning for other ad-hoc networks further includes determining if a particular discovery packet or other message received outside the availability window includes information about one or more of a plurality of services that may be of interest to the device. Information that may be of interest to the device may match a criteria defined by configuration data.

Another aspect disclosed is a leaf device for wireless communication in an ad-hoc communications network. The leaf device includes a receiver configured to receive a message identifying a number of times the message has been forwarded, and a processor configured to selectively scan for other ad-hoc networks based on the identified number.

In some embodiments, the processor is further configured to scan for other ad-hoc networks if the identified number is greater than or equal to a maximum number of hops. In some embodiments, the processor is further configured to increment the number of times the received message has been forwarded and forward the received message if the identified number is less than a maximum number of hops.

In some embodiments, the processor is further configured to not forward the message if the identified number is greater than or equal to a maximum number of hops. In some embodiments, the processor is further configured to join a second ad-hoc network based on the selective scanning. In some embodiments, the device is a leaf device of the ad-hoc network if the identified number of times is greater than or equal to a maximum number of hops. In some embodiments, the received message includes a synchronization message transmitted by a root device. In some embodiments, whether to selectively scan based on the identified number is configurable.

In some embodiments, the processor is further configured to selectively scan for other ad-hoc networks by receiving messages outside an availability window for the ad-hoc communications network. In some of these embodiments, the processor is further configured to selectively scan by determining if a particular discovery packet or other message received outside the availability window includes information about one or more of a plurality of services that may be of interest to the device. Information that may be of interest to the device may match a criteria defined by configuration data.

Another aspect disclosed is a leaf device for wireless communication in an ad-hoc communications network. The leaf device includes means for receiving a message identifying a number of times the message has been forwarded, and means for selectively scanning for other ad-hoc networks based on the identified number. In some embodiments, the means for selectively scanning selectively scans for other ad-hoc networks if the identified number is greater than or equal to a maximum number of hops. In some embodiments, the device also includes means for incrementing the number of times the received message has been forwarded and forwarding the received message if the identified number is less than a maximum number of hops. In some embodiments, the device includes means for not forwarding the message if the identified number is greater than or equal to a maximum number of hops. In some embodiments, the device includes means for joining a second ad-hoc network based on the selective scanning. In some embodiments, the device is a leaf device of the ad-hoc network if the identified number of times is greater than or equal to a maximum number of hops. In some embodiments, the received message comprises a synchronization message transmitted by a root device. In some embodiments, the device includes means for configuring whether to selectively scan based on the identified number.

In some embodiments, the means for selectively scanning selectively scans for other ad-hoc networks by receiving messages outside an availability window for the ad-hoc communications network. In some embodiments, the means for selectively scanning determines if a particular discovery packet or other message received outside the availability window includes information about one or more of a plurality of services that may be of interest to the device. Information that may be of interest to the device may match a criteria defined by configuration data.

Another aspect disclosed is a non-transitory, computer readable medium including instructions that when executed cause a processor to perform a method of wireless communication by a leaf device in an ad-hoc communications network. The method includes receiving a message identifying a number of times the message has been forwarded, and selectively scanning for other ad-hoc networks based on the identified number. In some embodiments, the selective scanning is performed if the identified number is greater than or equal to a maximum number of hops. In some embodiments, the method also includes incrementing the number of times the received message has been forwarded and forwarding the received message if the identified number is less than a maximum number of hops. In some embodiments, the method includes not forwarding the message if the identified number is greater than or equal to a maximum number of hops.

In some embodiments, the method includes joining a second ad-hoc network based on the selective scanning. In some embodiments, the device is a leaf device of the ad-hoc network if the identified number of times is greater than or equal to a maximum number of hops. In some embodiments, the received message comprises a synchronization message sent from a root device. In some embodiments, the method includes configuring whether to selectively scan based on the identified number. In some embodiments, selectively scanning for other ad-hoc networks includes receiving messages outside an availability window for the ad-hoc communications network. In some of these embodiments, selectively scanning for other ad-hoc networks further includes determining if a particular discovery packet or other message received outside the availability window includes information about one or more of a plurality of services that may be of interest to the device. Information that may be of interest to the device may match a criteria defined by configuration data.

Another aspect disclosed is a method of wireless communication on an ad-hoc network. The method includes receiving, by a first device, a message identifying a location of a root device of a first ad-hoc network, determining, by the first device, a location of the first device, and selectively scanning, by the first device, for other ad-hoc networks based on the location of the first device and the location of the root device. In some aspects, the selective scanning is performed if the distance between the first device and the root device is greater than a threshold distance. In some aspects, the message from the root device can include a second threshold distance, which sets a maximum allowed device distance and should be no less than the first threshold distance for selective scanning Devices with distance from the root device greater than the second threshold should not join the first ad-hoc network to limit the network within a certain area. If the second threshold distance is used, the difference between the two threshold distances should be less than typical device radio coverage radius, so that devices in the first ad-hoc network with distance from the root between the two thresholds are possible to reach those in other ad-hoc networks via selecting scanning.

In some aspects, the method also includes joining a second ad-hoc network as a result of the selective scanning In some aspects, the method also includes determining a window schedule for the second ad-hoc network, and transmitting a discovery message on the first ad-hoc network, the discovery message indicating the window schedule. In some aspects, the selective scanning is further based on a remaining battery life of the first device.

Another aspect disclosed is an apparatus for wireless communication on an ad-hoc network. The apparatus includes a receiver configured to receive a message identifying a location of a root device of a first ad-hoc network, a processor configured to determine a location of the first device, and a processor configured to selectively scan for other ad-hoc networks based on the location of the first device and the location of the root device. In some aspects, the selective scanning is performed if the distance between the first device and the root device is greater than a threshold distance. In some aspects, the apparatus also includes a processor configured to join a second ad-hoc network as a result of the selective scanning In some aspects, the apparatus also includes a processor configured to determine a window schedule for the second ad-hoc network, and a transmitter configured to transmit a discovery message on the first ad-hoc network, the discovery message indicating the window schedule. In some aspects, the processor is further configured to selectively scan based on a remaining battery life of the apparatus.

Another aspect disclosed is an apparatus for wireless communication on an ad-hoc network. The apparatus includes means for receiving a message identifying a location of a root device of a first ad-hoc network, means for determining a location of the first device; and means for selectively scanning for other ad-hoc networks based on the location of the first device and the location of the root device. In some aspects, the selective scanning is performed if the distance between the first device and the root device is greater than a threshold distance. In some aspects, the apparatus also includes means for joining a second ad-hoc network as a result of the selective scanning. In some aspects, the apparatus also includes means for determining a window schedule for the second ad-hoc network, and means for transmitting a discovery message on the first ad-hoc network, the discovery message indicating the window schedule. In some aspects, the means for selectively scanning is configured to selectively scan based on a remaining battery life of the apparatus.

Another aspect disclosed is a non-transitory, computer readable medium comprising instructions that when executed cause a processor to perform a method of wireless communication on an ad-hoc network. The method includes receiving, by a first device, a message identifying a location of a root device of a first ad-hoc network, determining, by the first device, a location of the first device, and selectively scanning, by the first device, for other ad-hoc networks based on the location of the first device and the location of the root device. In some aspects, the selective scanning is performed if the distance between the first device and the root device is greater than a threshold distance. In some aspects, the method further includes joining a second ad-hoc network as a result of the selective scanning In some aspects, the method further includes determining a window schedule for the second ad-hoc network, and transmitting a discovery message on the first ad-hoc network, the discovery message indicating the window schedule. In some aspects, the selective scanning is based on a remaining battery life.

Another aspect disclosed is a method of wireless communication on an ad-hoc network. The method includes joining, by a device, the ad-hoc network, determining, by the device, a window schedule for a second ad-hoc network, and transmitting, by the device, a discovery message on the first ad-hoc network, the discovery message indicating the window schedule. In some aspects, the method includes determining, by the device, a second window schedule for a third ad-hoc network, wherein the discovery message indicates the second window schedule.

Another aspect disclosed is an apparatus for wireless communication on an ad-hoc network. The apparatus includes a processor configured to join the ad-hoc network, a processor configured to determine a window schedule for a second ad-hoc network, and a transmitter configured to transmit a discovery message on the first ad-hoc network, the discovery message indicating the window schedule. In some aspects, the apparatus also includes a processor configured to determine a second window schedule for a third ad-hoc network, wherein the processor is configured to transmit the discovery message further indicating the second window schedule.

Another aspect disclosed is an apparatus for wireless communication on an ad-hoc network. The apparatus includes means for joining the ad-hoc network, means for determining a window schedule for a second ad-hoc network, and means for transmitting a discovery message on the first ad-hoc network, the discovery message indicating the window schedule. In some aspects, the apparatus also includes means for determining a second window schedule for a third ad-hoc network, wherein the means for transmitting is configured to transmit the discovery message further indicating the second window schedule.

Another aspect disclosed is a non-transitory computer readable medium comprising instructions that when executed cause a processor to perform a method of wireless communication on an ad-hoc network. The method includes joining the ad-hoc network, determining a window schedule for a second ad-hoc network, and transmitting a discovery message on the first ad-hoc network, the discovery message indicating the window schedule. In some aspects, the method also includes determining a second window schedule for a third ad-hoc network, wherein the discovery message indicates the second window schedule.

BRIEF DESCRIPTION OF THE DRAWINGS

FIG. 3b is a flowchart of an exemplary process of discovering devices in a wireless communication system in accordance with aspects of the present disclosure.

FIG. 3c is a flowchart of an exemplary process of querying devices in a wireless communication system in accordance with aspects of the present disclosure.

DETAILED DESCRIPTION

Figure 1A:
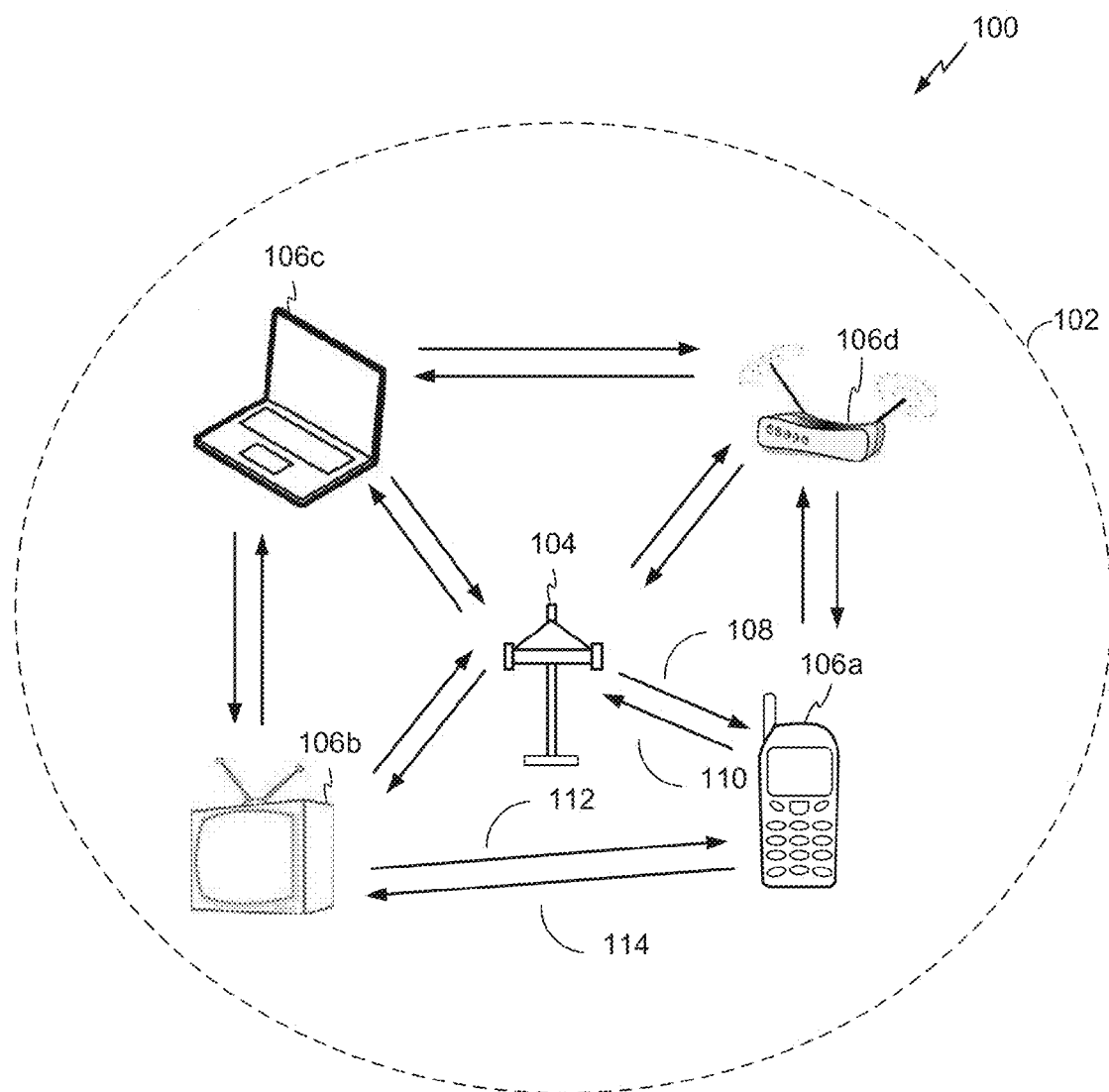
FIG. 1a illustrates an example of a prior art wireless communication system.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. However, the various aspects described herein may apply to any communication standard, such as a wireless protocol.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, a root node of an ad-hoc network may transmit synchronization messages to coordinate one or more availability windows for communication between nodes of the ad-hoc network. The availability window may also be known as a discovery interval as discussed below. If these synchronization messages are received by nodes of the ad-hoc network, they may be forwarded or retransmitted. In an embodiment, whether a node retransmits or forwards a synchronization message may be based on a hop count field included in the message.

Nodes positioned near the edge of a first ad-hoc network may receive synchronization messages that have a hop count near or at a maximum hop count value. Since these nodes may be positioned near the edge of the first ad-hoc network, the strength of the signals exchanged between edge nodes and the ad-hoc network may be relatively weak. In some embodiments, this may reduce the reliability or maximum throughput available using the first ad-hoc network. Additionally, because the nodes may be positioned at the edge of the first ad-hoc network, they may also be positioned so as to be within the transmission and reception range of other ad-hoc networks.

Therefore, aspects of the present disclosure provide for methods, apparatus, and computer readable medium for nodes positioned near or at the edge of an ad-hoc network. These aspects provide for selective scanning for other ad-hoc networks based, at least in part, on an indicator of a number of times a message has been forwarded by a first ad-hoc network. If a device may determine that it is positioned at or near the edge of the first ad-hoc network, for example, based on a hop count included in a forwarded message from the first ad-hoc network, it may selectively scan for and join one or more other ad-hoc networks. By participating in or joining multiple ad-hoc networks, in an embodiment, a leaf or edge node may provide gateway functionality between the first and a second ad-hoc network.

Additionally, the selective scanning by an edge or leaf node and subsequent joining of one or more additional ad-hoc networks may provide for improved network connectivity for the leaf node. For example, a throughput or reliability from a second ad-hoc network available to a leaf node of a first ad-hoc network may be improved when compared to the network connectivity available to the leaf node via the existing first ad-hoc network connection.

Figure 2:
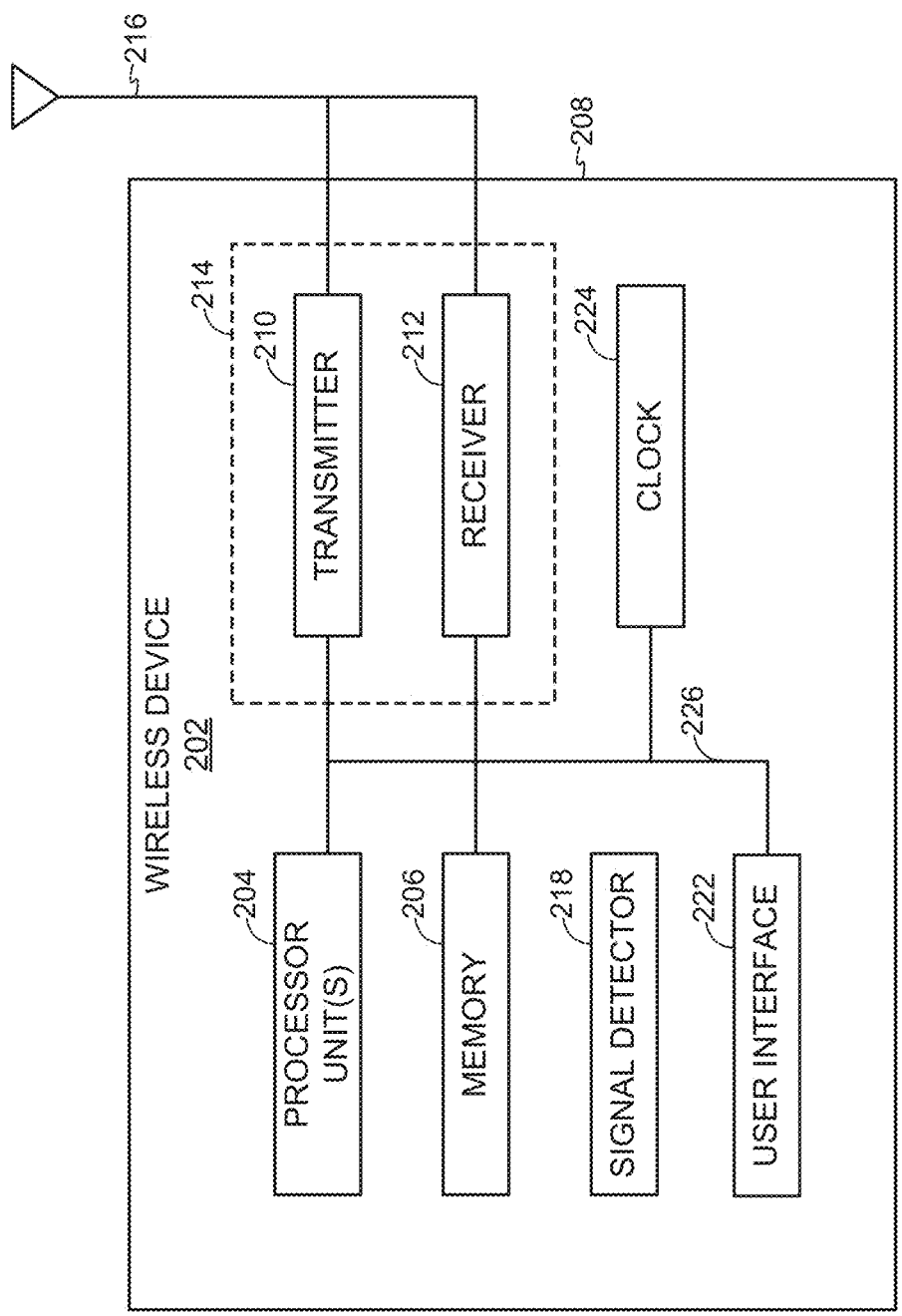
FIG. 2 illustrates a functional block diagram of a wireless device that may be employed within the wireless communication system of FIG. 1.

FIG. 2 illustrates various components that may be utilized in a wireless device 202 that may be employed within the wireless communication system 100 or 160. The wireless device 202 is an example of a device that may be configured to implement the various methods described herein. For example, the wireless device 202 may comprise the AP 104 or one of the STAs.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. In addition, the wireless device 202 may include a clock 224 configured to generate a clock signal that is used to coordinate and synchronize activities of the wireless device 202. In some configurations, the processor 204 may include the clock 224. The processor 204 may be configured to update the clock with a time value to allow for synchronization with other wireless devices.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different packet types or functions. For example, the transmitter 210 may be configured to transmit packets of different types generated by the processor 204. When the wireless device 202 is implemented or used as an AP 104 or STA 106, the processor 204 may be configured to process packets of a plurality of different packet types. For example, the processor 204 may be configured to determine the type of packet and to process the packet and/or fields of the packet accordingly. When the wireless device 202 is implemented or used as an AP 104, the processor 204 may also be configured to select and generate one of a plurality of packet types. For example, the processor 204 may be configured to generate a discovery packet comprising a discovery message and to determine what type of packet information to use in a particular instance.

The receiver 212 may be configured to wirelessly receive packets having different packet types. In some aspects, the receiver 212 may be configured to detect a type of a packet used and to process the packet accordingly.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. The components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Figure 1B:
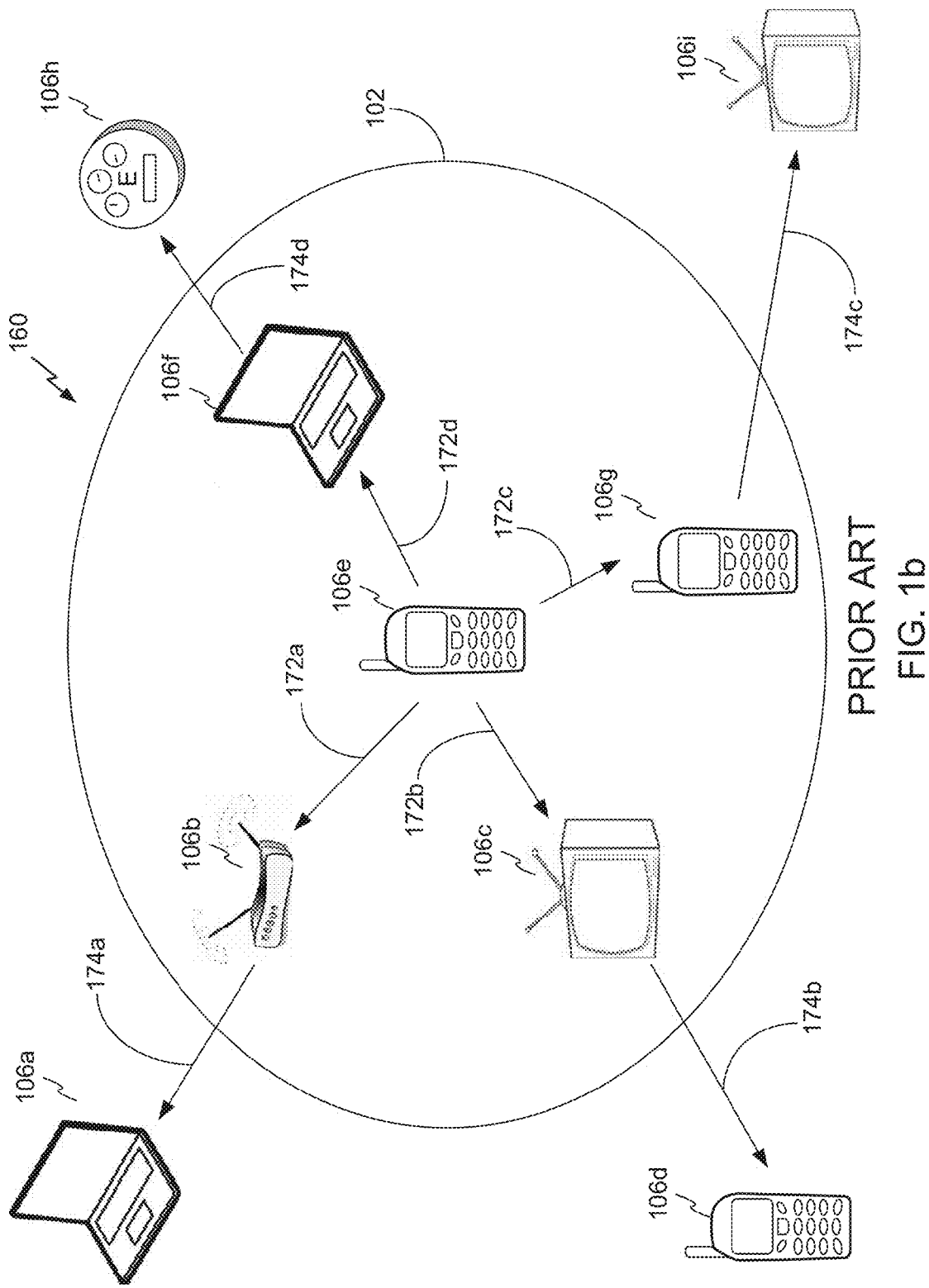
FIG. 1b illustrates another example of a prior art wireless communication system.

Devices, such as STAs, 106a-i shown in FIG. 1b, for example, may be used for neighborhood aware networking, or social-WiFi networking. For example, various stations within the network may communicate on a device to device (e.g., peer-to-peer communications or ad-hoc communications) basis with one another regarding applications that each of the stations supports. A discovery protocol may be used in a social-WiFi network to enable STAs to advertise themselves (e.g., by sending discovery packets) as well as discover services provided by other STAs (e.g., by sending paging or query packets), while ensuring secure communication and low power consumption. Furthermore, at least a portion of the discovery protocol may be related to coordinating and/or synchronizing activities of the STAs. It should be noted that a discovery packet may also be referred to as a discovery message or a discovery frame. It should also be noted that a paging or query packet may also be referred to as a paging or query message or a paging or query frame.

Furthermore, to ensure proper communication between multiple STAs, STAs may require information regarding characteristics of other STAs. For example, the STA 106 may require timing information about the AP 104 in order to synchronize timing of communication between the STA 106 and the AP 104. Additionally or alternatively, the STA 106 may require other information such as a medium access control (MAC) address of the AP 104 or another STA, an identifier of the basic service set (BSS) served by the AP 104, etc. The STA 106 may determine whether it needs such information independently, such as through software that is executed using memory 206 and processor 204.

The AP 104 or STA 106 may have a plurality of operational modes. For example, the STA 106 may have a first operational mode referred to as an active mode, normal operation mode, or full power mode. In the active mode, the STA 106 may always be in an "awake" state and actively transmit/receive data with another STA 106. Further, the STA 106 may have a second operational mode referred to as a power-save mode or sleep mode. In the power-save mode, the STA 106 may be in the "awake" state or may be in a "doze" or "sleep" state where the STA 106 does not actively transmit/receive data with another STA 106. For example, the receiver 212 and possibly DSP 220 and signal detector 218 of the STA 106 may operate using reduced power consumption in the doze state. Further, in the power-save mode, a STA 106 may occasionally enter the awake state to listen to messages from an AP 104 or from other STAs (e.g., paging messages) that indicate to the STA 106 whether or not the STA 106 needs to "wake up" (e.g., enter the awake state) at a certain time so as to be able to transmit/receive data with the AP 104 or another STA.

Figure 3A:
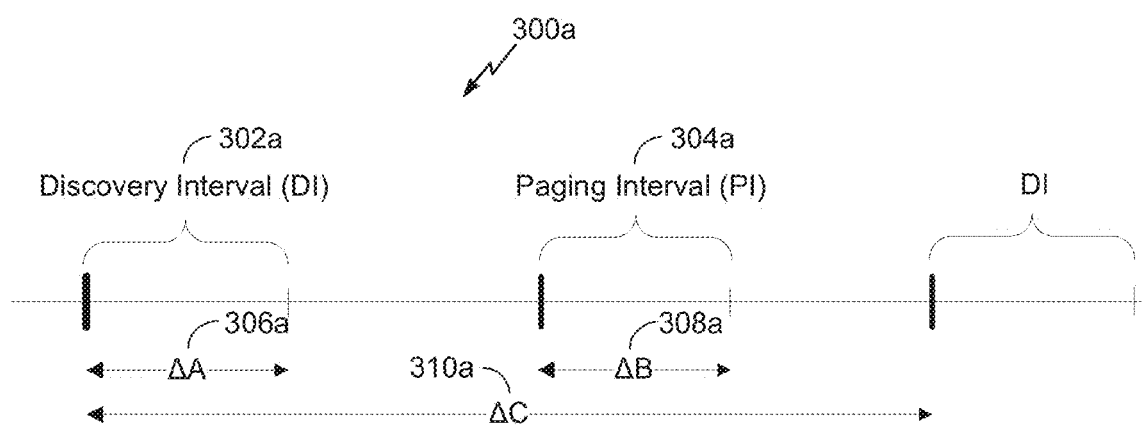
FIG. 3a illustrates an exemplary communication timeline in a wireless communication system in accordance with aspects of the present disclosure.

FIG. 3a illustrates an exemplary communication timeline 300a in a wireless communication system where STAs may communicate via one channel. In one aspect, the communication according to the timeline shown in FIG. 3a may be used in an ad-hoc wireless network, such as the network shown in FIG. 1b or FIG. 1c. The exemplary communication timeline 300a may include a discovery interval (DI) 302a of a time duration ΔA 306a, a paging interval (PI) 304a of a time duration ΔB 308a, and an overall interval of a time duration ΔC 310a. In some aspects, communications may occur via other channels as well. Time increases horizontally across the page over the time axis.

During the DI 302a, APs or STAs may advertise services through broadcast messages such as discovery packets. APs or STAs may listen to broadcast messages transmitted by other APs or STAs. In some aspects, the duration of DIs may vary over time. In other aspects, the duration of the DI may remain fixed over a period of time. The end of the DI 302a may be separated from the beginning of the subsequent PI 304a by a first remainder period of time as illustrated in FIG. 3a. The end of the PI 304a may be separated from the beginning of a subsequent DI by a different remainder period of time as illustrated in FIG. 3a. However, different combinations of remainder time periods are contemplated.

During the PI 304a, APs or STAs may indicate interest in one or more of a plurality of services advertised in a broadcast message by transmitting paging request messages such as paging request packets. APs or STAs may listen to paging request messages transmitted by other APs or STAs. In some aspects, the duration of the PI may vary over time. In other aspects, the duration of the PI may remain constant over a period of time. In some aspects, the duration of the PI may be less than the duration of the DI.

The overall interval of duration ΔC 310a may measure the period of time from the beginning of one DI to the beginning of a subsequent DI as illustrated in FIG. 3a. In some aspects, the duration of the overall interval may vary over time. In other aspects, the duration of the overall interval may remain constant over a period of time. At the conclusion of the overall interval of duration ΔC 310a, another overall interval may begin, including a DI, a PI, and the remainder intervals. Consecutive overall intervals may follow indefinitely or continue for a fixed period of time.

A STA may enter a sleep or power-save mode when the STA is not transmitting or listening or is not expecting to transmit or listen. As an example, the STA may sleep during periods other than the DI or PI. The STA in the sleep mode or power-save mode may awake or return to normal operation or full power mode at the beginning of the DI or PI to enable transmission or listening by the STA. In some aspects, the STA may awake or return to normal operation or full power mode at other times when the STA expects to communicate with another device, or as a result of receiving a notification packet instructing the STA to awake. The STA may awake early to ensure that the STA receives a transmission.

As described above, during the DI, APs or STAs may transmit discovery packets (DPs). During the PI, APs or STAs may transmit paging request packets (PRs). A DP may be a packet configured to advertise a plurality of services provided by a STA or AP and to indicate when the paging interval is for the device that transmits the discovery packet. The DP may include a data frame, management frame, or management action frame. The DP may carry information generated by a higher layer discovery protocol or an application based discovery protocol. The PR may be a packet configured to indicate interest in at least one of the plurality of services provided by an AP or STA.

The start and end of the DI and PI may be known via numerous methods to each STA desiring to transmit a discovery packet or a paging request packet. In some aspects, each STA may synchronize its clock with the other APs or STAs and set a shared DI and PI start time and DI duration and PI duration. In other aspects, a device may send a signal such as a special clear to send (S-CTS) signal to clear the medium of legacy communications, such as communications that may conflict or not be compliant with aspects of the present disclosure, and indicate the beginning and duration of the DI or PI period, as well as additional information about the DI and PI durations.

A STA potentially interested in services advertised via discovery packets, such as from other STAs, may awake or remain awake during the DI and process discovery packets to determine if a particular discovery packet includes information about one or more of a plurality of services that may be of interest to the receiving STA. After the DI period, STAs not planning to communicate information may enter a sleep or power-save mode for a break period until the next time the STAs plan to communicate. In some aspects, a STA may enter the sleep or power-save mode until the STA may communicate additional information with another device outside of the DI or PI. In some aspects, the STA may enter the sleep or power-save mode until the beginning of the next PI. At the beginning of the PI, the interested STA may awake to transmit a paging request packet to the provider of the service.

A STA waiting for a response to a transmitted discovery packet, such as discovery packets transmitted to other STAs, may awake or remain awake during the PI and process paging request packets to determine if a particular paging request packet indicates interest by another device in at least one of plurality of services provided by the STA. After the PI period, STAs not planning to communicate information may enter a sleep or power-save mode for a break period until the next time the STAs plan to communicate. In some aspects, a STA may enter the sleep or power-save mode until the STA may communicate additional information with another device outside of the DI or PI. In some aspects, the STA may enter the sleep or power-save mode until the beginning of the next DI.

As examples, the duration ΔC of the overall interval may equal approximately one to five seconds in some aspects. In other aspects, the overall interval may be less than one second or more than five seconds. The duration ΔA of the DI may equal approximately 16 milliseconds in some aspects while more or less than 16 milliseconds in other aspects. The duration ΔB of the PI may equal approximately the duration ΔA in some aspects. In other aspects, the duration ΔB may be more or less than the duration ΔA.

FIG. 3b is a flowchart of an exemplary process 300b of discovering devices in a wireless communication system. The process 300b may be used to introduce two devices, such as two STAs and 106b. For example, a STA may advertise information about one or more of a plurality of services that may be of interest to various other STAs to which the information is directed. In some embodiments, a service offered by a STA may include a service offered by an application (e.g., a gaming application, a shopping application, a social networking application, etc.) that a user has downloaded or that is native to the STA. For example, a user of the STA may want to invite other users of the application to interact with the user via the application. At block 302b, the STA may initiate transmission of announcements. Each announcement may include a discovery packet or message including the information relating to the one or more services. At block 304b, the STA may wake up from a power-save mode or sleep mode during a discovery interval to send announcements to one or more STAs. At block 306b, the STA may send one or more short announcements regarding a particular service, such as "Jack's Fruits,"

in order to facilitate discovery of the STA. The short announcements may include a discovery packet or message. The receiving STAs that are interested in the one or more services advertised by the STA may respond with a paging request (or query request) packet or message that indicates interest in the service provided by the STA. Whether an STA is "interested" in the one or more services may be based on one or more parameters. For example, configuration data may store a list of services a device is "interested" in. The configuration data may be based on a user's preferences for services. These preferences may be received via a user interface or network connection. For example, the user's preferences may be initialized when a mobile device is provisioned. The user's preferences for services may be stored in configuration data. The configuration data may define one or more criteria that can be used to evaluate a service to determine whether the service is of interest to the device.

At block 308b, the STA may receive queries (e.g., a paging or query request) for information on the particular service, such as "Jack's Fruits." In response, at block 310b, the STA may send a response to the queries. Follow on messaging between the STA and the various querying STAs may occur. The STA and the various STAs may enter power-save mode or sleep mode in the intervals between the exchanges of messages between the STAs. The receiving may be performed by receiver 212 or the transceiver 214, for example, and the transmitting may be performed by the transmitter 210 or the transceiver 214, for example.

FIG. 3c is a flowchart of an exemplary process 300c of querying devices in a wireless communication system in accordance with aspects of the present disclosure. At block 302c, a STA may input a shopping list, which may include various vendors that a user of the STA may have an interest. For example, a user may download a shopping list from the Internet. Although the process 300c is described with respect to a shopping application, those having ordinary skill in the art will appreciate that the process 300c applies to other applications, such as gaming applications, social networking applications, etc. At block 304c, the STA may set up filters for the shopping list. For example, a filter may be set up to allow the STA to wake up from a power-save mode or sleep mode only when a discovery packet or message is received for particular vendors or applications. At block 306c, the STA may wake up during a discovery interval to listen to announcements. Each announcement may include a discovery packet or message including information relating to one or more services offered by one or more other STAs. At block 308c, the STA may receive an announcement from a second STA, such as a "Jack's Fruits" announcement. The STA may determine whether it is interested in one or more sets of information related to the announcement and may respond with a paging request (or query request) packet or message that indicates its interest in the information. For example, if the STA is interested in a particular sale item offered by the second STA, the STA may respond with a paging request (or query request) packet or message. At block 310c, the STA sends a query for more information relating to the announcement, such as more information on Jack's Fruits. At block 312c, the STA may receive a response to one or more queries that the STA sent to other STAs regarding services offered by the other STAs.

It is desirable for the STAs described above (e.g., using a discovery protocol used in a social-WiFi network) to be able to advertise themselves, as well as discover services provided by other STAs, using a secure communication protocol and while keeping power consumption low. For example, it is desirable for a STA to advertise its offered services by securely sending discovery packets or messages and for the STA to discover services offered by other STAs by securely sending paging or query packets or messages while avoiding excess power consumption. For example in accordance with certain embodiments, STAs may "sleep" a majority of a time period and wake up for short discovery intervals as described to decrease power consumption. There may be certain conditions that allow the STAs to make use of short time intervals to decrease power consumption while still effectively allowing discovery and advertisement of services within the network. For example, it is desirable that STAs that transmit during the short time intervals "know" that intended receivers are active to receive the transmitting messages. In addition, it is further desirable that STAs that are searching for different services advertised by another STA 106 activate their receivers at the appropriate time to receive messages advertising services from other STAs. As such, certain embodiments described herein are directed to synchronization between different STAs to allow for performing device discovery as described above and for synchronization of other communications while allowing for reduced power consumption. For example certain embodiments are directed to synchronization so that STAs are activated for transmitting and receiving at the same time.

Furthermore, when STAs communicate without a central coordinator, such as an AP 104, synchronization of communications between the STAs may be desirable. As just described, if the STAs are not synchronized, the STAs may not receive discovery messages within the discovery interval, or be able to transmit paging requests within the correct paging interval to be received by other STAs. Synchronization therefore may provide a common reference time that may be used to determine timing of communication intervals such as the discovery interval 302a and the paging interval 304a. As each STA 106 operates independently of the other STAs, each generating an individual clock signal, the clock signal may become out of sync. For example, if a STA 106 is in a "doze" state, the clock signal may drift and define a reference time value that is faster or slower as compared to other clocks signals of other STAs.

Certain aspects described herein are directed to devices and methods for synchronization of clock signals of STAs operating in an ad-hoc fashion. In one aspect, at least some of the STAs may transmit the current time value of their clock signals to the other STAs. For example, in accordance with certain embodiments, STAs may periodically transmit a 'sync' frame that carries a time stamp. The current time value may correspond to a time-stamp value. For example, in one embodiment, a discovery message as described above may serve as the 'sync' frame and carry a current time value of a STA 106. In addition to the time stamp, the sync frame may also include information regarding the discovery interval and discovery period. For example, the sync frame may include the schedule of the discovery interval and discovery period. In some embodiments, the sync frame may also include information identifying a device to generate prospective synchronization messages. For example, an indication of a back-up root node may be included in the sync frame.

Upon receipt of a sync frame, a STA 106 that may be new to the network may determine the time and the discovery interval/discovery period schedule in the network. STAs already communicating within the network may maintain synchronization while overcoming clock drift as described below. Based on the sync message, STAs may enter and exit a network (e.g., a NAN) without losing synchronization. Furthermore, the synchronization messages described herein may allow for avoiding excessive power drain and the STAs in the network may share the burden of messaging for synchronization. Furthermore, certain embodiments allow for a low messaging overhead (e.g., as only a few devices may send sync frames in every discovery period as will be described below). As described above with reference to FIG. 3A, discovery packets within a NAN are transmitted during a discovery interval 302a that occurs every discovery period. As such, sync messages may be sent during a discovery interval 302a for certain discovery periods.

It should be appreciated that a STA 106 may not transmit a sync frame every discovery interval. Rather, a probability value (P_sync), as is further described below, may be used to determine whether the STA 106 transmits and/or prepares a sync frame. As such, while at least some sync frames are sent for every discovery interval, not all the STAs participating in the NAN transmit a sync frame for every discovery interval. This may allow for reduced power consumption in transmitting sync frames while still enabling synchronization.

Figure 4A:
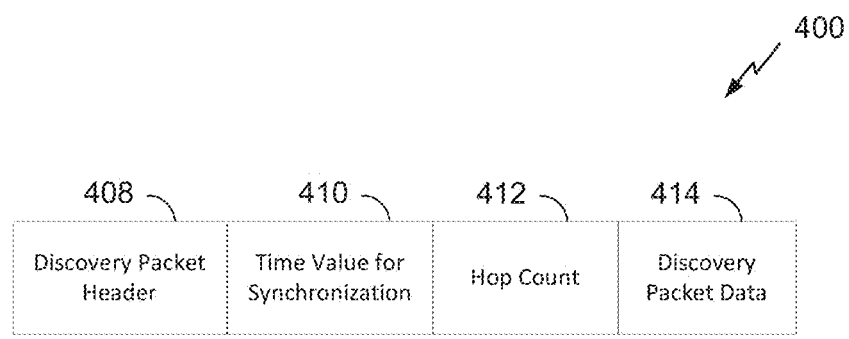
FIG. 4A illustrates a message that may include a time value for synchronization.

FIG. 4A illustrates a message 400 that may include a time value for synchronization. As described above, in some embodiments, the message 400 may correspond to a discovery message as described above. The message 400 may include a discovery packet header 408. The message may further include 410 a time value for synchronization 410. In some embodiments, the discovery packet header 408 may include the time value 410. The time value may correspond to a current time value of a clock signal of a STA 106 transmitting the message 400. The message 400 may further include a hop count 412. To extend the range of an ad-hoc network, nodes of the ad-hoc network may selectively forward synchronization messages. The hop count field 412 may identify the number of times the synchronization message 400 has been forwarded. When a node of the ad-hoc network forwards the message 400, it may increment the hop count field 412. If the hop count field reaches a maximum hop count, nodes receiving the message 400 may not forward the message. This prevents messages from being forwarded indefinitely. The message 400 may further include discovery packet data 414. While FIG. 4A shows discovery message serving as the sync message, it should be appreciated that according to other embodiments, the sync message may be sent apart from the discovery message.

Figure 4B:
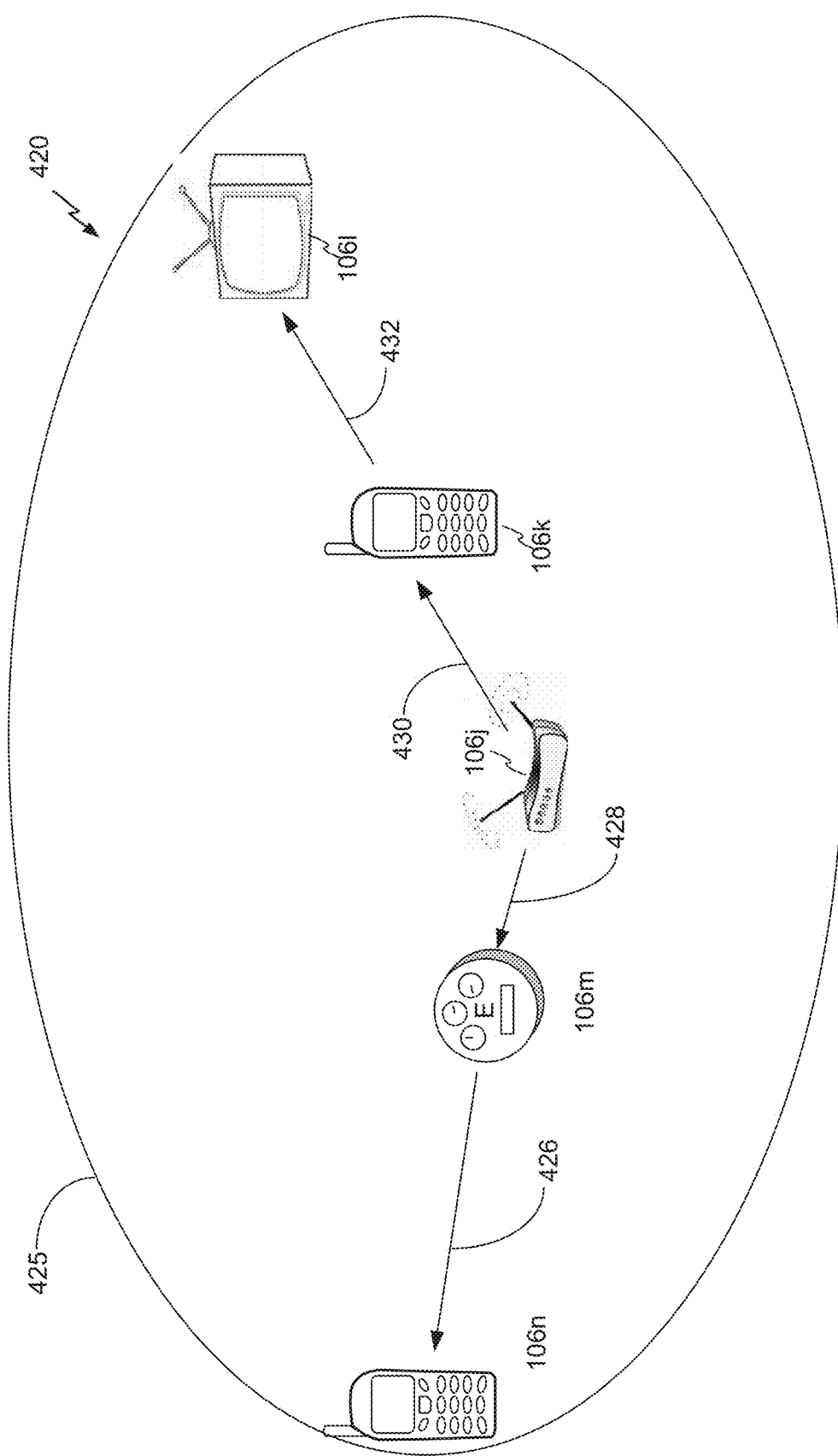
FIG. 4b illustrates an example of a wireless communication system.

FIG. 4b illustrates an example of a wireless communication system 420 in which aspects of the present disclosure may be employed. FIG. 4b shows an ad-hoc network 420 including a root node 106j. The root node 106j transmits messages 430 and 428, which are received by nodes 106k and 106m respectively. In an embodiment, messages 430 and 428 may be broadcast. In an embodiment, messages 430 and 428 may be the same message, received by both nodes 106m and 106k. Messages 430 and 428 may include a hop count field 414 as illustrated in FIG. 4A. When root node 106j initially transmits a message, it may set the hop count field to an initial value, for example zero (0) or one (1). When the message(s) are received by nodes 106k and 106m, these nodes may compare the hop count field included in the message to a maximum value. If the hop count field is less than the maximum value, they may increment the hop count field and forward the message(s). In an embodiment, messages 428 and 430 may be a synchronization message.

FIG. 4b shows node 106k retransmitting or forwarding message 430 as message 432. Message 432 is received by node 106l. Node 106m retransmits or forwards message 428 as message 426 after incrementing the hop count field included in message 428. When node 106n receives message 426, it may determine that the hop count included in the message has reached a maximum hop count. Therefore, node 106n does not forward message 426. Similarly, node 106l may also determine that the hop count field of message 432 has reached a maximum hop count value, and will not forward message 432 as a result.

Figure 4C:
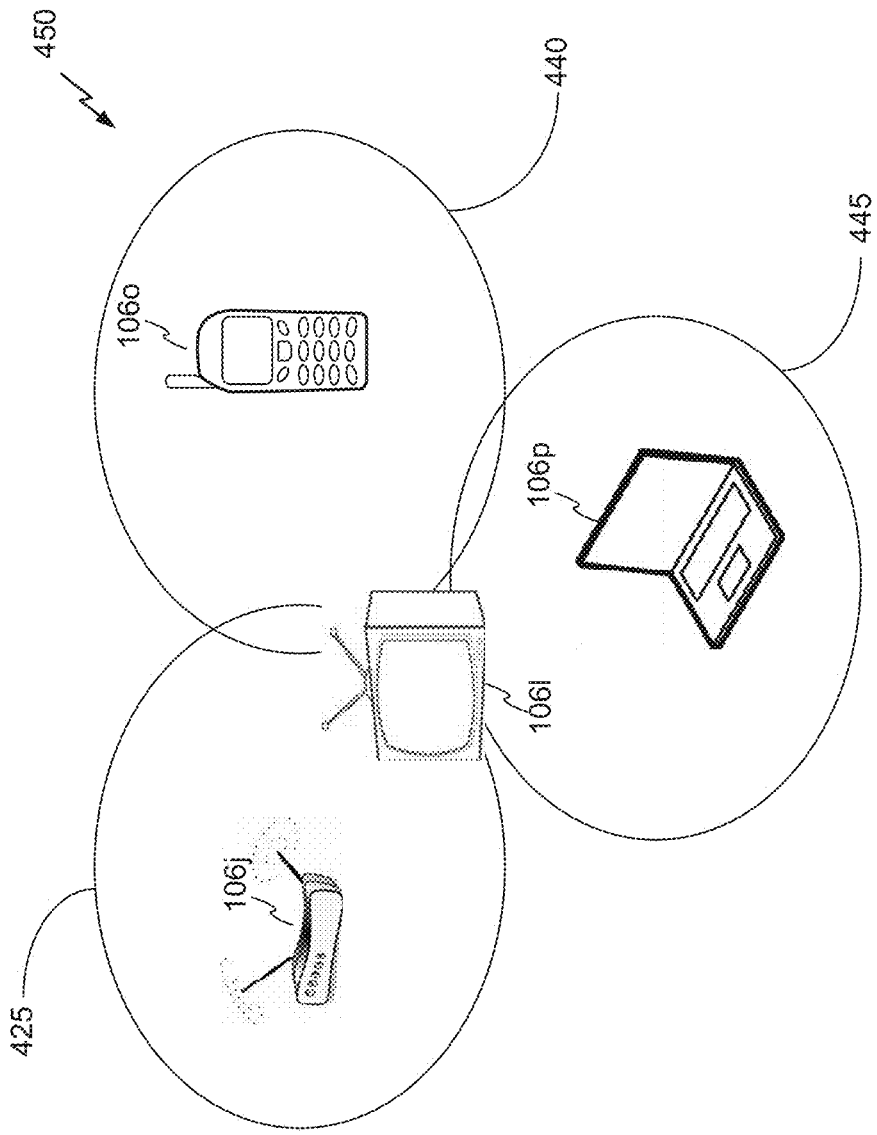
FIG. 4c illustrates another example of a wireless communication system.

FIG. 4c illustrates an example of a wireless communication system 450 in which aspects of the present disclosure may be employed. FIG. 4c shows network 425 of FIG. 4b, with root node 106j and leaf node 106l. Other nodes from FIG. 4b have been omitted from FIG. 4c for clarity. FIG. 4c also shows other ad-hoc networks 440 and 445. Ad-hoc network 440 includes root node 106o and ad-hoc network 445 includes root node 106p. The circles 440 and 445 show the approximate edge of the ad-hoc networks of root nodes 106o and 106p respectively. As shown, leaf node 106l is positioned at the edge of network 425. As such, when messages are received by lead node 106l from root node 106j, the hop count may be set to a maximum hop value. Leaf node 106l may not forward messages from root node 106j as a result.

In some aspects, messages received from root node 106j by leaf node 106l that include a hop count field greater than or equal to a maximum hop count may provide an indication to leaf node 106l that it is positioned near an edge of network 425. In response, in some embodiments, node 106l may selectively scan for other ad-hoc networks. For example, FIG. 4c shows other ad-hoc networks 440 and 445. Node 106l is positioned within range of these networks, and may be able to receive messages from root nodes 106o and/or 106p. In an embodiment, node 106l may join one or both of networks 440 and 445, in addition to participating in the first ad-hoc network 425.

In some aspects, node 106l may selectively scan for ad-hoc networks based on a hop count in a message received from root node 106j being greater than or equal to a first hop count value. Messages from root node 106j may be forwarded by node 106l if the hop count in the messages is greater than or equal to a second hop count value. In some aspects, the second hop count value is greater than the first hop count value.

Figure 5:
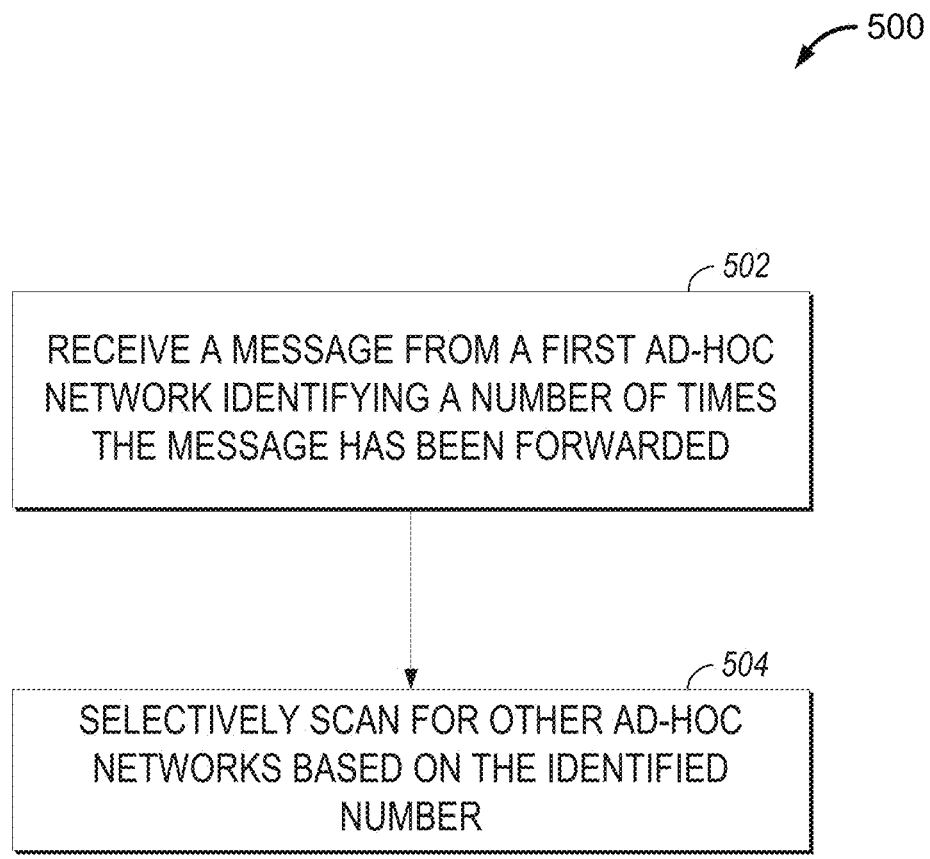
FIG. 5 is a flowchart of a method of synchronizing a wireless communications apparatus, in accordance with an embodiment.

FIG. 5 is a flowchart of a method 500 of wireless communication. In an embodiment, process 500 is performed by a device in an ad-hoc network. In another embodiment, process 500 is performed by a leaf device in an ad-hoc network. Although the method 500 is described below with respect to the elements of the wireless device 202, those having ordinary skill in the art will appreciate that other components may be used to implement one or more of the blocks described herein.

At block 502, a message is received from a first ad-hoc network. In some aspects, the message is received from a root device of the first ad-hoc network. The message identifies a number of times the message has been forwarded. In one embodiment, the message includes a "hop count" field. The "hop count" field is incremented whenever a node of a wireless network forwards the message. When the "hop count" reaches a maximum hop count, nodes receiving the message do not forward the message. This prevents messages from being forwarded indefinitely. Nodes receiving a message with a "hop count" field at a maximum value may be positioned at an edge of an ad-hoc network. In other words, these nodes may be leaf nodes.

In block 504, a device selectively scans for other ad-hoc networks based on the identified number. The other ad-hoc networks are networks different than the first ad-hoc network. In an embodiment, leaf nodes as described above may scan for other ad-hoc networks. In some of these embodiments, non-leaf nodes may not scan for other ad-hoc networks. If one or more other ad-hoc networks are found as a result of the selective scanning, a leaf node may join one or more of the identified ad-hoc networks. In an embodiment, a leaf node may compare the network performance of two or more ad-hoc networks and disconnect from an ad-hoc network based on the comparison. For example, a leaf node may remain in communication with an ad-hoc network exhibiting superior network connectivity when compared to other ad-hoc networks it may be able to communicate with. In an embodiment, whether to selectively scan for ad-hoc networks based on the identified number may be configurable. For example, in some aspects, a first set of leaf nodes may be configured to scan for other ad-hoc networks while a second set of leaf nodes are configured not to scan for other ad-hoc networks. In some aspects, selectively scanning for other ad-hoc networks includes determining if a particular discovery packet or other message received outside the availability window matches a criteria defined by configuration data.

As described above with respect to FIGS. 3A-C, selectively scanning for other ad-hoc networks may include remaining awake and/or listening for network traffic during one or more DI or PI intervals to determine if a particular discovery packet or other message includes information about one or more of a plurality of services that may be of interest to the device. In an embodiment, selectively scanning may comprise receiving and/or processing messages outside an availability window or discovery interval for an ad-hoc network a station is in communication with.

In some aspects, a device performing process 500 may selectively scan for ad-hoc networks if a hop count in the received message of block 502 is greater than or equal to a first hop count value. The first hop count value may be equivalent to the number of times the received message has been forwarded. In some aspects, process 500 may further include forwarding the received message if the hop count in the received message is greater than or equal to a second hop count value. In some aspects, the second hop count value is greater than the first hop count value. In some aspects, the second hop count value is equivalent to the first hop count value.

In some aspects, the selective scanning may be based on the first device's remaining battery life. For example, in some aspects, if the remaining battery life is above a first energy threshold, the first scanning period and a first scanning duration may be utilized. A scanning period may be an elapsed time between scans. In some aspects, if the remaining battery life is below a second energy threshold, a second scanning period and a second scanning duration may be utilized. In some aspects, the second scanning period may be greater than the first scanning period. In some aspects, the second scanning duration may be lower than the first scanning duration.

Figure 6:
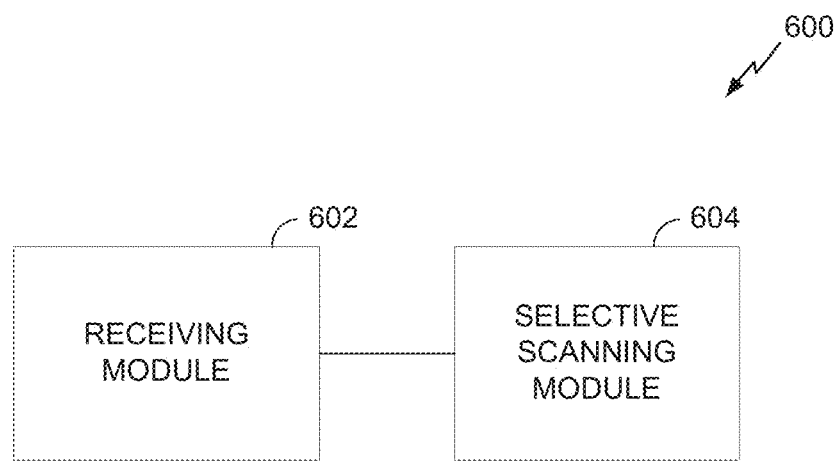
FIG. 6 is a functional block diagram of an exemplary wireless communication apparatus that may be employed with the wireless communication system of FIG. 4b, or FIG. 4c.

FIG. 6 is a functional block diagram of an exemplary wireless communication device 600 that may be employed with the wireless communication system of FIG. 4b, or FIG. 4c. The wireless device 600 may include a receiving module 602. In an embodiment, the receiving module 602 may comprise the receiver 212. In one aspect, the receiving module 602 may also include one or more of a processor, signal generator, transceiver, decoder, or a combination of hardware and/or software component(s), circuits, and/or module(s). In one aspect, means for receiving may include the receiving module 602. The receiving module 602 may be configured to perform one or more of the functions described above with respect to block 502 of FIG. 5. The wireless device 600 may further include a selective scanning module 604. The selective scanning module 604 may include the processor unit(s) 204 of FIG. 2. In one aspect, the selective scanning module 604 may also include one or more of a processor, signal generator, transceiver, decoder, or a combination of hardware and/or software component(s), circuits, and/or module(s). In one aspect, means for selective scanning may include the selective scanning module 604. The selective scanning module 604 may be configured to perform one or more of the functions described above with respect to block 504 of FIG. 5.

Figure 7:
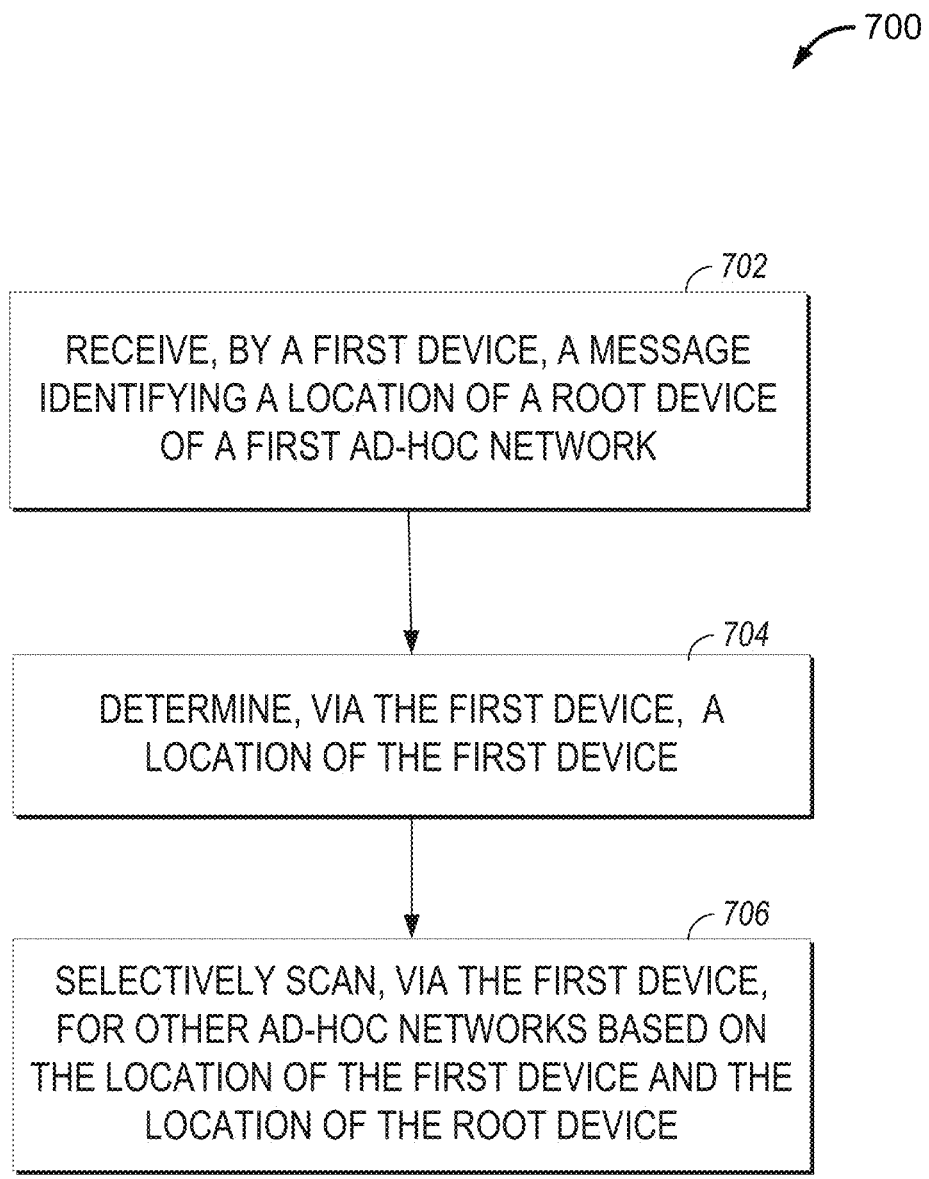
FIG. 7 is a flowchart of a method of synchronizing a wireless communications apparatus, in accordance with an embodiment.

FIG. 7 is a flowchart of a method 700 of wireless communication. In an embodiment, process 700 is performed by a device in an ad-hoc network. In another embodiment, process 700 is performed by a leaf device in an ad-hoc network. Although the method 700 is described below with respect to the elements of the wireless device 202, those having ordinary skill in the art will appreciate that other components may be used to implement one or more of the blocks described herein.

In block 702, a message is received by a first device. The message identifies a location of a root device for a first ad-hoc network. For example, in some aspects, the message may indicate global positioning coordinates of the root device. In some other aspects, the location of the root device may be determined based on cellular signals. For example, the location may be determined based on one or more distances from one or more corresponding keypoints. In some aspects, the keypoints may be access points, cellular transmitters, or stations. In some aspects, the received message is a synchronization message. In some aspects, the received message identifies a first ad-hoc network.

In block 704, the first device determines a location of the first device. In some aspects, the first device determines its location based on GPS signals. In other aspects, the first device may determine its location based on cellular signals. For example, the location may be determined based on measured round-trip delays to a plurality of cellular transmitters.

In block 706, the first device selectively scans for other ad-hoc networks based on the location of the first device and the location of the root device. The other ad-hoc networks are ad-hoc networks different than the first ad-hoc network. In some aspects, the first device may selectively scan for other ad-hoc networks if the distance between its location and the root device is greater than a first threshold distance.

In some aspects, the selective scanning may be based on the first device's remaining battery life. For example, in some aspects, if the remaining battery life is above a first energy threshold, the first scanning period and a first scanning duration may be utilized. A scanning period may be an elapsed time between scans. In some aspects, if the remaining battery life is below a second energy threshold, a second scanning period and a second scanning duration may be utilized. In some aspects, the second scanning period may be greater than the first scanning period. In some aspects, the second scanning duration may be lower than the first scanning duration.

In some aspects, the message received by the device in block 702 can indicate the first threshold distance discussed above. In some aspects, the message received by the device in block 702 can further indicate or include a second threshold distance. In some aspects, the second threshold distance indicates a maximum allowed device distance to join an ad-hoc network identified by the received message. In some aspects, the second threshold distance is greater than the first threshold distance.

In some aspects a device may determine a distance between the root device and its present location. If this distance is greater than the second threshold distance, the device may not join the ad-hoc network identified by the message received in block 702. This provides a distance limit on devices participating in the ad-hoc network identified by the message received in block 702.

In some aspects, the difference between the first and second threshold distances should be less than a device radio coverage radius. This enables devices participating or joining the first ad-hoc network with a distance from a root device that lies between the first and second threshold distances can join other ad-hoc networks via selecting scanning.

Figure 8:
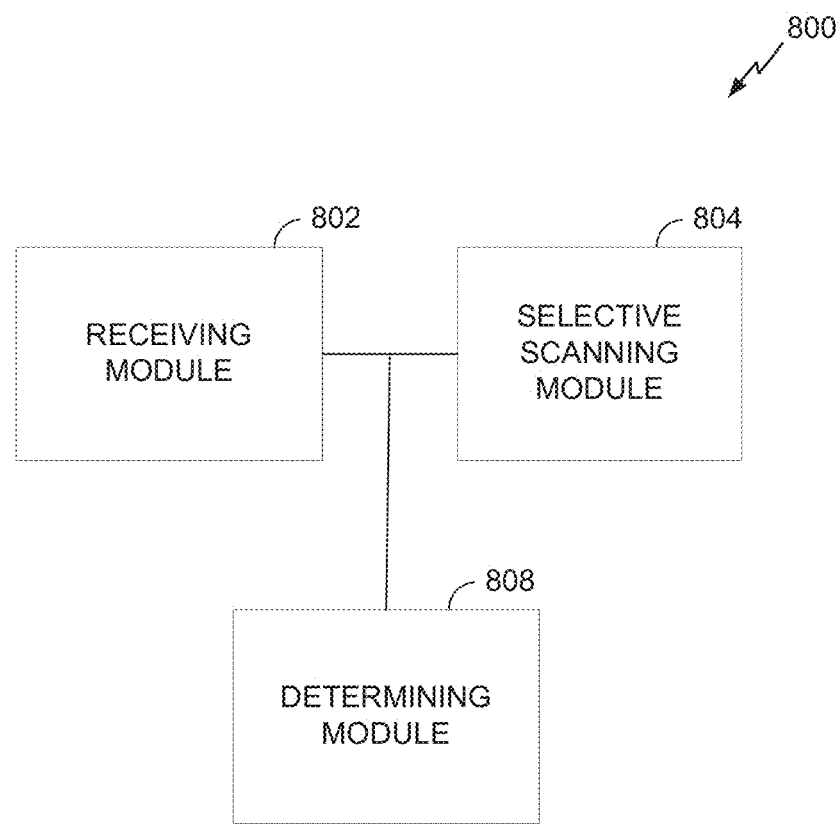
FIG. 8 is a functional block diagram of an exemplary wireless communication apparatus that may be employed with the wireless communication system of FIG. 4b, or FIG. 4c.

FIG. 8 is a functional block diagram of an exemplary wireless communication device 800 that may be employed with the wireless communication system of FIG. 4b, or FIG. 4c. The wireless device 800 may include a receiving module 802. In an embodiment, the receiving module 802 may comprise the receiver 212. In one aspect, the receiving module 802 may also include one or more of a processor, signal generator, transceiver, decoder, or a combination of hardware and/or software component(s), circuits, and/or module(s). In one aspect, means for receiving may include the receiving module 802. The receiving module 802 may be configured to perform one or more of the functions described above with respect to block 702 of FIG. 7. The wireless device 800 may further include a selective scanning module 804. The selective scanning module 804 may include the processor unit(s) 204 of FIG. 2. In one aspect, the selective scanning module 804 may also include one or more of a processor, signal generator, transceiver, decoder, or a combination of hardware and/or software component(s), circuits, and/or module(s). In one aspect, means for selective scanning may include the selective scanning module 804. The selective scanning module 804 may be configured to perform one or more of the functions described above with respect to block 706 of FIG. 7. The wireless device 800 may further include a determining module 806. The determining module 806 may include the processor unit(s) 204 of FIG. 2. In one aspect, the determining module 806 may also include one or more of a processor, signal generator, transceiver, decoder, or a combination of hardware and/or software component(s), circuits, and/or module(s). In one aspect, means for determining may include the determining module 806. The determining module 806 may be configured to perform one or more of the functions described above with respect to block 704 of FIG. 7.

Figure 9:
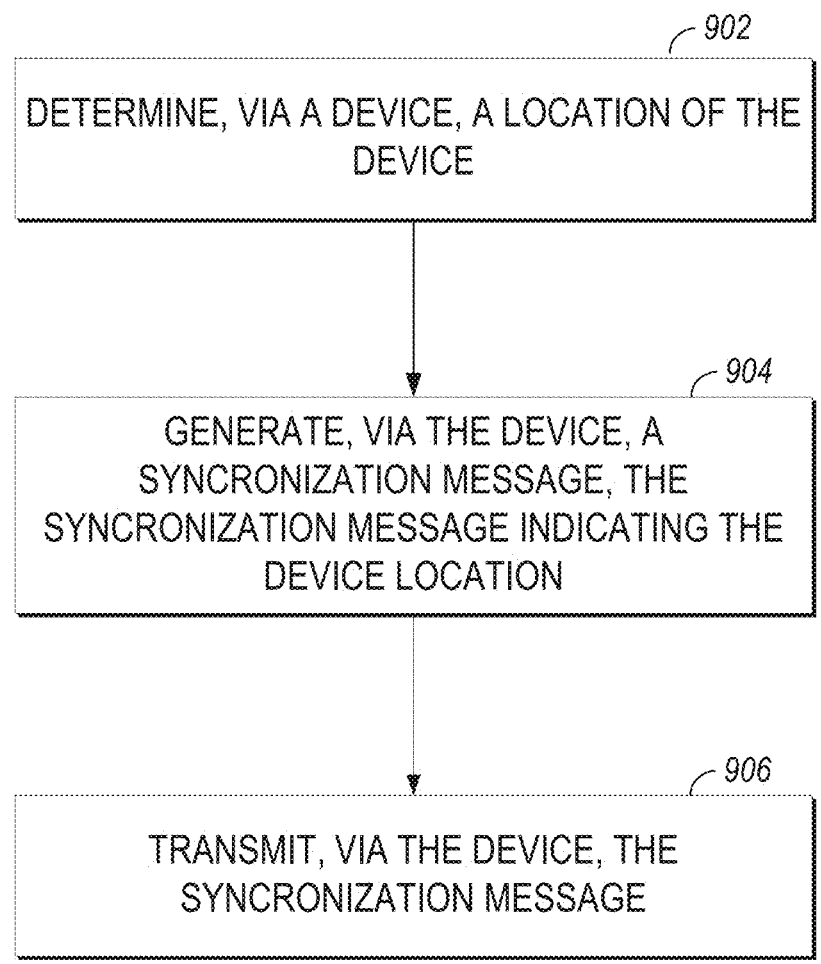
FIG. 9 is a flowchart of a method of synchronizing a wireless communications apparatus, in accordance with an embodiment.

FIG. 9 is a flowchart of a method 900 of wireless communication. In an embodiment, process 900 is performed by a device in an ad-hoc network. In another embodiment, process 900 is performed by a leaf device in an ad-hoc network. Although the method 900 is described below with respect to the elements of the wireless device 202, those having ordinary skill in the art will appreciate that other components may be used to implement one or more of the blocks described herein.

In block 902, a device determines its location. In some aspects, the location is determined based on GPS signals. In some aspects, the location is determined based on cellular signals. For example, in some aspects, the location is based on measured round-trip delays to a plurality of cellular transmitters. In block 904, a synchronization message is generated, the synchronization message indicating the device location. In some aspects, the location is included in the synchronization message. In block 906, the synchronization message is transmitted by the device.

Figure 10:
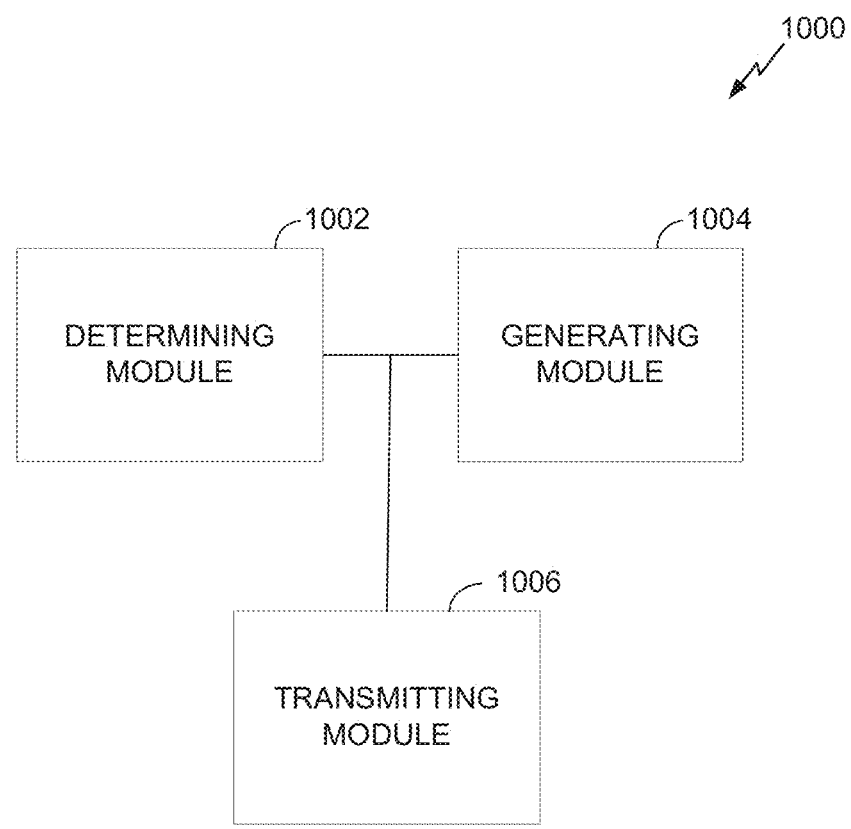
FIG. 10 is a functional block diagram of an exemplary wireless communication apparatus that may be employed with the wireless communication system of FIG. 4b, or FIG. 4c.

FIG. 10 is a functional block diagram of an exemplary wireless communication device 1000 that may be employed with the wireless communication system of FIG. 4b, or FIG. 4c. The wireless device 1000 may include a determining module 1002. In an embodiment, the determining module 1002 may comprise the processor 204. In one aspect, the determining module 1002 may also include one or more of a processor, signal generator, transceiver, decoder, or a combination of hardware and/or software component(s), circuits, and/or module(s). In one aspect, means for determining may include the determining module 1002. The determining module 1002 may be configured to perform one or more of the functions described above with respect to block 902 of FIG. 9. The wireless device 1000 may further include a generating module 1004. The generating module 1004 may include the processor unit(s) 204 of FIG. 2. In one aspect, the generating module 1004 may also include one or more of a processor, signal generator, transceiver, decoder, or a combination of hardware and/or software component(s), circuits, and/or module(s). In one aspect, means for generating may include the generating module 1004. The generating module 1004 may be configured to perform one or more of the functions described above with respect to block 904 of FIG. 9. The wireless device 1000 may further include a transmitting module 1006. The transmitting module 1006 may include the transmitter 210 of FIG. 2. In one aspect, the transmitting module 1006 may also include one or more of a processor, signal generator, transceiver, decoder, or a combination of hardware and/or software component(s), circuits, and/or module(s). In one aspect, means for transmitting may include the transmitting module 1006. The transmitting module 1006 may be configured to perform one or more of the functions described above with respect to block 906 of FIG. 9.

Figure 11:
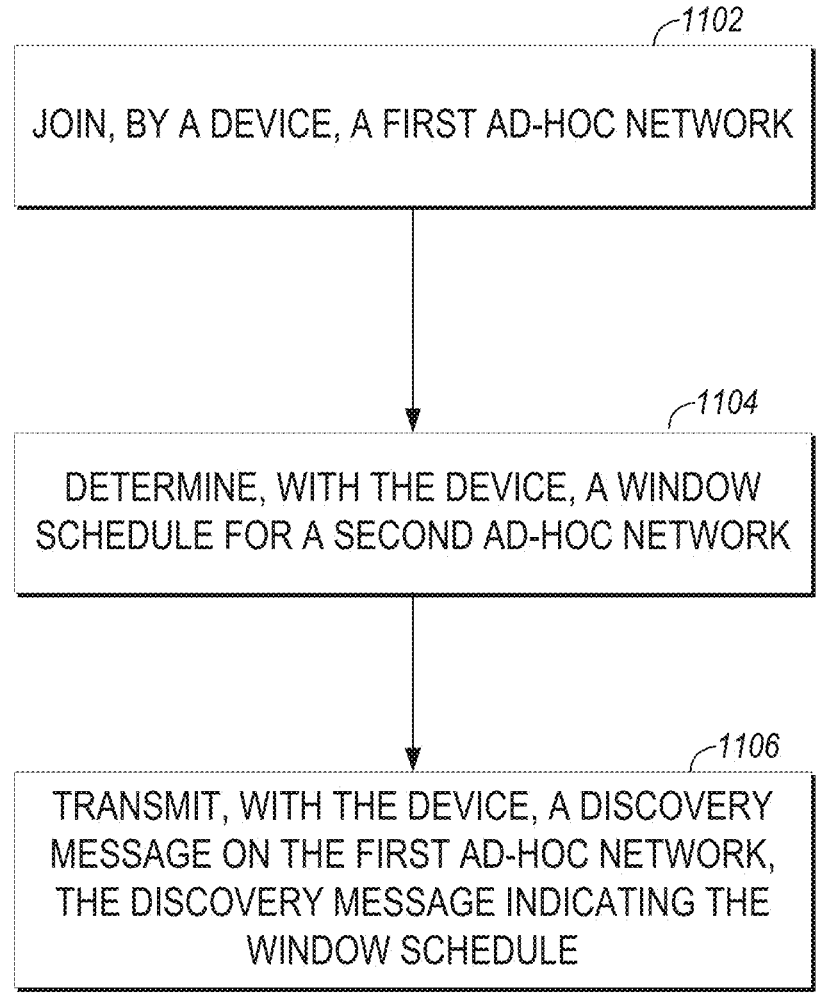
FIG. 11 is a flowchart of a method of synchronizing a wireless communications apparatus, in accordance with an embodiment.

FIG. 11 is a flowchart of a method 1100 of wireless communication. In an embodiment, process 1100 is performed by a device in an ad-hoc network. In another embodiment, process 1100 is performed by a leaf device in an ad-hoc network. Although the method 1100 is described below with respect to the elements of the wireless device 202, those having ordinary skill in the art will appreciate that other components may be used to implement one or more of the blocks described herein.

In block 1102, a device joins a first ad-hoc network. In block 1104, the device determines a window schedule for a second ad-hoc network. The second ad-hoc network is different than the first ad-hoc network. In some aspects, the device may selectively scan for a second ad-hoc network based on a distance from a root device or a hop count included in a synchronization message, as discussed above with respect to FIGS. 5 and 7. Therefore, in some aspects, block 1104 may include process 500 of FIG. 5 and/or process 700 of FIG. 7. In some aspects, the device may determine a plurality of window schedules for a plurality of other ad-hoc networks.

In block 1106, the device transmits a discovery message on the first ad-hoc network. The discovery message indicates the window schedule for the second ad-hoc network. In some aspects, the discovery message may be received by one or more other devices that are participating in the first ad-hoc network. Those devices may utilize the window schedule provided in the discovery message to more efficiently search for the second ad-hoc network. In some aspects, the discovery message may indicate a plurality of window schedules for a plurality of ad-hoc networks.

Figure 12:
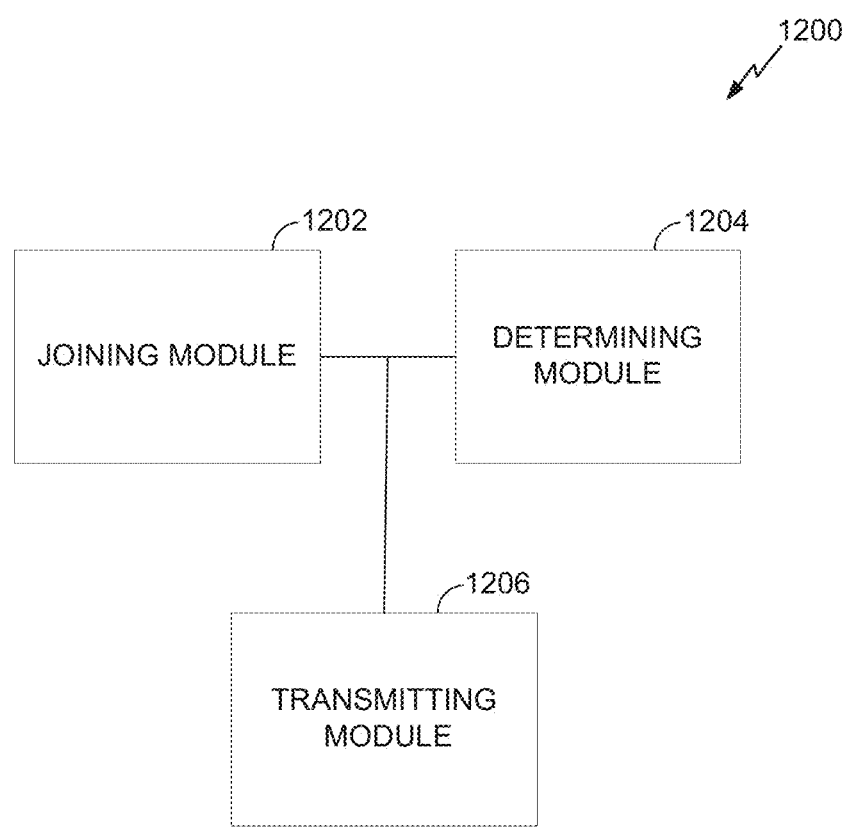
FIG. 12 is a functional block diagram of an exemplary wireless communication apparatus that may be employed with the wireless communication system of FIG. 4b, or FIG. 4c.

FIG. 12 is a functional block diagram of an exemplary wireless communication device 1200 that may be employed with the wireless communication system of FIG. 4b, or FIG. 4c. The wireless device 1200 may include a joining module 1202. In an embodiment, the joining module 1202 may comprise the processor 204. In one aspect, the joining module 1202 may also include one or more of a processor, signal generator, transceiver, decoder, or a combination of hardware and/or software component(s), circuits, and/or module(s). In one aspect, means for joining may include the joining module 1202. The joining module 1202 may be configured to perform one or more of the functions described above with respect to block 1102 of FIG. 11. The wireless device 1200 may further include a determining module 1204. The determining module 1204 may include the processor unit(s) 204 of FIG. 2. In one aspect, the determining module 1204 may also include one or more of a processor, signal generator, transceiver, decoder, or a combination of hardware and/or software component(s), circuits, and/or module(s). In one aspect, means for determining may include the determining module 1204. The determining module 1204 may be configured to perform one or more of the functions described above with respect to block 1104 of FIG. 11. The wireless device 1200 may further include a transmitting module 1206. The transmitting module 1206 may include the transmitter 210 of FIG. 2. In one aspect, the transmitting module 1206 may also include one or more of a processor, signal generator, transceiver, decoder, or a combination of hardware and/or software component(s), circuits, and/or module(s). In one aspect, means for transmitting may include the transmitting module 1206. The transmitting module 1206 may be configured to perform one or more of the functions described above with respect to block 1106 of FIG. 11.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-11 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of wireless communication by a leaf device in a first ad-hoc communications network, comprising:
   determining a discovery interval and a paging interval for the first ad-hoc communications network;
   receiving, by a device, a message from the first ad-hoc communications network identifying a number of times the message has been forwarded;
   remaining awake and processing messages outside the discovery interval and paging interval in response to the number of times the message has been forwarded exceeding a threshold, wherein processing messages outside the discovery window and paging interval comprises:
   scanning, by the device, for other ad-hoc networks, and joining a second ad-hoc network based on the scanning; and
   entering a sleep state outside the discovery interval and the paging interval in response to the number of times the message has been forwarded being below the threshold.

2. The method of claim 1, further comprising incrementing the number of times the received message has been forwarded and forwarding the received message if the identified number is less than a maximum number of hops.

3. The method of claim 1, further comprising not forwarding the message if the identified number is greater than or equal to a maximum number of hops.

4. The method of claim 1, further comprising joining a second ad-hoc network based on the selective scanning.

5. The method of claim 1, wherein the device is a leaf device of the ad-hoc network if the identified number of times is greater than or equal to a maximum number of hops.

6. The method of claim 1, wherein the received message comprises a synchronization message transmitted by a root device.

7. The method device of claim 1, wherein whether to selectively scan is further based on configuration data.

8. The method of claim 1, wherein selectively scanning for other ad-hoc networks comprises receiving messages outside an availability window for the ad-hoc communications network.

9. The method of claim 1, wherein the selective scanning is based on a remaining battery life of the device.

10. The method of claim 8, wherein selectively scanning for other ad-hoc networks further comprises determining if a particular discovery packet or other message received outside the availability window matches a criteria defined by configuration data.

11. A leaf device for wireless communication in a first ad-hoc communications network, comprising:
    a processor configured to determine a discovery interval and a paging interval for the first ad-hoc communications network;
    a receiver configured to receive a message from the ad-hoc communications network identifying a number of times the message has been forwarded, and
    wherein the processor is further configured to:
      remain awake and process messages outside the discovery interval and paging interval in response to the number of times the message has been forwarded exceeding a threshold, wherein processing messages outside the discovery window and paging interval comprises:
    scanning for other ad-hoc networks in response to the identified number being greater than or equal to a maximum number of hops, and joining a second ad-hoc network based on the scanning; and
    entering a sleep state outside the discovery interval and the paging interval in response to the number of times the message has been forwarded being below the threshold.

12. The device of claim 11, wherein the processor is further configured to:
    increment the number of times the received message has been forwarded and forward the received message if the identified number is less than a maximum number of hops.

13. The device of claim 11, wherein the processor is further configured to not forward the message if the identified number is greater than or equal to a maximum number of hops.

14. The device of claim 11, wherein the processor is further configured to join a second ad-hoc network based on the selective scanning.

15. The device of claim 11, wherein the device is a leaf device of the ad-hoc network if the identified number of times is greater than or equal to a maximum number of hops.

16. The device of claim 11, wherein the received message comprises a synchronization message transmitted by a root device.

17. The device of claim 11, wherein whether to selectively scan is further based on configuration data.

18. The device of claim 11, wherein the processor is further configured to selectively scan for other ad-hoc networks by receiving messages outside an availability window for the ad-hoc communications network.

19. The device of claim 11, wherein the selective scanning is based on a remaining battery life of the device.

20. The device of claim 18, wherein the processor is further configured to selectively scan by determining if a particular discovery packet or other message received outside the availability window includes matches a criteria defined by configuration data.

21. A leaf device for wireless communication in an ad-hoc communications network, comprising:
    means for determining a discovery interval and a paging interval for the first ad-hoc communications network;
    means for receiving a message from the ad-hoc communications network identifying a number of times the message has been forwarded;

means for remaining awake and processing messages outside the discovery interval and paging interval in response to the number of times the message has been forwarded exceeding a threshold, wherein processing messages outside the discovery window and paging interval comprises:
means for scanning, by the device, for other ad-hoc networks, and joining a second ad-hoc network based on the scanning; and
means for entering a sleep state outside the discovery interval and the paging interval in response to the number of times the message has been forwarded being below the threshold.

22. The device of claim 21, further comprising means for incrementing the number of times the received message has been forwarded and forwarding the received message if the identified number is less than a maximum number of hops.

23. The device of claim 21, further comprising means for not forwarding the message if the identified number is greater than or equal to a maximum number of hops.

24. The device of claim 21, further comprising means for joining a second ad-hoc network based on the selective scanning.

25. The device of claim 21, wherein the device is a leaf device of the ad-hoc network if the identified number of times is greater than or equal to a maximum number of hops.

26. The device of claim 21, wherein the received message comprises a synchronization message transmitted by a root device.

27. The device of claim 21, wherein the means for selectively scanning selectively scans for other ad-hoc networks by receiving messages outside an availability window for the ad-hoc communications network.

28. The device of claim 21, wherein the means for selective scanning is configured to base the selective scanning on a remaining battery life of the device.

29. The device of claim 27, wherein the means for selectively scanning determines if a particular discovery packet or other message received outside the availability window matches a criteria defined by configuration data.

30. A non-transitory, computer readable medium comprising instructions that when executed cause a processor to perform a method of wireless communication by a leaf device in an ad-hoc communications network, the method comprising:
determining a discovery interval and a paging interval for the first ad-hoc communications network;
receiving, by a device, a message from the first ad-hoc communications network identifying a number of times the message has been forwarded;
remaining awake and processing messages outside the discovery interval and paging interval in response to the number of times the message has been forwarded exceeding a threshold, wherein processing messages outside the discovery window and paging interval comprises:
scanning, by the device, for other ad-hoc networks, and joining a second ad-hoc network based on the scanning; and
entering a sleep state outside the discovery interval and the paging interval in response to the number of times the message has been forwarded being below the threshold.

31. The non-transitory, computer readable medium of claim 30, further comprising incrementing the number of times the received message has been forwarded and forwarding the received message if the identified number is less than a maximum number of hops.

32. The non-transitory, computer readable medium of claim 30, further comprising not forwarding the message if the identified number is greater than or equal to a maximum number of hops.

33. The non-transitory, computer readable medium of claim 30, the method further comprising joining a second ad-hoc network based on the selective scanning.

34. The non-transitory, computer readable medium of claim 30, wherein the device is a leaf device of the ad-hoc network if the identified number of times is greater than or equal to a maximum number of hops.

35. The non-transitory, computer readable medium of claim 30, wherein the received message comprises a synchronization message transmitted by a root device.

36. The non-transitory, computer readable medium device of claim 30, wherein whether to selectively scan is further based on configuration data.

37. The non-transitory, computer readable medium of claim 30, wherein selectively scanning for other ad-hoc networks comprises receiving messages outside an availability window for the ad-hoc communications network.

38. The non-transitory, computer readable medium of claim 37, wherein selectively scanning for other ad-hoc networks further comprises determining if a particular discovery packet or other message received outside the availability window matches a criteria defined by configuration data.

39. A method of wireless communication on an ad-hoc network, comprising:
determining a discovery interval and a paging interval for the first ad-hoc communications network;
receiving, by a first device, a message identifying a geographical location of a root device of a first ad-hoc network;
determining, by the first device, a geographical location of the first device;
determining a distance between the geographical location of the root device and the geographical location of the first device;
remaining awake and processing messages outside the discovery interval and paging interval in response to the distance exceeding a distance threshold, wherein processing messages outside the discovery window and paging interval comprises:
scanning, by the device, for other ad-hoc networks, and joining a second ad-hoc network based on the scanning; and
entering a sleep state outside the discovery interval and the paging interval in response to the distance being below the distance threshold.

40. The method of claim 39, wherein the selective scanning is performed if the distance between the first device and the root device is greater than a threshold distance.

41. The method of claim 40, further comprising joining a second ad-hoc network as a result of the selective scanning.

42. The method of claim 39, wherein the selective scanning is further based on a remaining battery life of the first device.

43. The method of claim 41, further comprising:
determining a window schedule for the second ad-hoc network; and
transmitting a discovery message on the first ad-hoc network, the discovery message indicating the window schedule.

44. The apparatus of claim 41, wherein the processor is further configured to selectively scan based on a remaining battery life of the apparatus.

45. An apparatus for wireless communication on an ad-hoc network, comprising:

a processor configured to determine a discovery interval and a paging interval for the first ad-hoc communications network;

a receiver configured to receive a message identifying a geographic location of a root device of a first ad-hoc network, wherein the processor is further configured to:

determine a geographic location of the first device; and determine a distance between the geographical location of the root device and the geographical location of the first device;

remain awake and process messages outside the discovery window and paging interval in response to the distance exceeding a distance threshold, wherein processing messages outside the discovery window and paging interval comprises scanning, by the device, for other ad-hoc networks and joining a second ad-hoc network based on the scanning; and entering a sleep state outside the discovery interval and the paging interval in response to the distance being below the distance threshold.

46. The apparatus of claim 45, wherein the selective scanning is performed if the distance between the first device and the root device is greater than a threshold distance.

47. The apparatus of claim 46, further comprising a processor configured to join a second ad-hoc network as a result of the selective scanning.

48. The apparatus of claim 47, further comprising:

a processor configured to determine a window schedule for the second ad-hoc network; and a transmitter configured to transmit a discovery message on the first ad-hoc network, the discovery message indicating the window schedule.

49. An apparatus for wireless communication on an ad-hoc network, comprising:

means for determining a discovery interval and a paging interval for the first ad-hoc communications network, and means for receiving a message identifying a geographic location of a root device of a first ad-hoc network;

means for determining a geographic location of the first device;

means determining a distance between the geographical location of the root device and the geographical location of the first device;

means for remaining awake and processing messages outside the discovery window and paging interval in response to the distance exceeding a distance threshold, wherein processing messages outside the discovery window and paging interval comprises: scanning for other ad-hoc networks and joining a second ad-hoc network based on the scanning; and means for entering a sleep state outside the discovery interval and the paging interval in response to the distance being below the distance threshold.

50. The apparatus of claim 49, wherein the selective scanning is performed if the distance between the first device and the root device is greater than a threshold distance.

51. The apparatus of claim 50, further comprising means for joining a second ad-hoc network as a result of the selective scanning.

52. The apparatus of claim 51, further comprising:

means for determining a window schedule for the second ad-hoc network; and means for transmitting a discovery message on the first ad-hoc network, the discovery message indicating the window schedule.

53. The apparatus of claim 51, wherein the means for selectively scanning is configured to selectively scan based on a remaining battery life of the apparatus.

54. A non-transitory, computer readable medium comprising instructions that when executed cause a processor to perform a method of wireless communication on an ad-hoc network, the method comprising:

determining a discovery interval and a paging interval for the first ad-hoc communications network;

receiving, by a first device, a message identifying a geographic location of a root device of a first ad-hoc network;

determining, by the first device, a geographic location of the first device; and determining a distance between the geographical location of the root device and the geographical location of the first device;

remaining awake and processing messages outside the discovery window and paging interval in response to the distance exceeding a distance threshold, wherein processing messages outside the discovery window and paging interval comprises:

scanning, by the device, for other ad-hoc networks, and joining a second ad-hoc network based on the scanning; and entering a sleep state outside the discovery interval and the paging interval in response to the distance being below the distance threshold.

55. The non-transitory, computer readable medium of claim 54, wherein the selective scanning is performed if the distance between the first device and the root device is greater than a threshold distance.

56. The non-transitory, computer readable medium of claim 55, the method further comprising joining a second ad-hoc network as a result of the selective scanning.

57. The non-transitory, computer readable medium of claim 56, the method further comprising:

determining a window schedule for the second ad-hoc network; and transmitting a discovery message on the first ad-hoc network, the discovery message indicating the window schedule.

58. The non-transitory, computer readable medium of claim 56, wherein the selective scanning is based on a remaining battery life.

59. A method of wireless communication on a first ad-hoc network, comprising:

joining, by a device, the first ad-hoc network;

receiving a synchronization message from the first ad-hoc network, the synchronization message indicating a first window schedule for the first ad-hoc network, the window schedule indicating a first timing reference for a first availability window during which communication occurs between nodes of the first ad-hoc network;

receiving a synchronization message from a second ad-hoc network, the synchronization message indicating a second window schedule, the second window schedule providing a second timing reference for a second availability window during which communication occurs between nodes of the second ad-hoc network; and transmitting, by the device, a discovery message on the first ad-hoc network, the discovery message indicating the second window schedule of the second ad-hoc network.

60. The method of claim 59, further comprising determining, by the device, a second window schedule for a third ad-hoc network, wherein the discovery message indicates the second window schedule.

61. An apparatus for wireless communication on a first ad-hoc network, comprising:
- a processor configured to join the ad-hoc network;
- a processor configured to:
  - receive a synchronization message from the first ad-hoc network, the synchronization message indicating a first window schedule for the first ad-hoc network, the window schedule indicating a first timing reference for a first availability window during which communication occurs between nodes of the first ad-hoc network;
  - receive a synchronization message from a second ad-hoc network, the synchronization message indicating a second window schedule, the second window schedule providing a second timing reference for a second availability window during which communication occurs between nodes of the second ad-hoc network; and
- a transmitter configured to transmit a discovery message on the first ad-hoc network, the discovery message indicating the second window schedule of the second ad-hoc network.

62. The apparatus of claim 61, further comprising a processor configured to determine a second window schedule for a third ad-hoc network, wherein the transmitter is configured to transmit the discovery message further indicating the second window schedule.

63. An apparatus for wireless communication on a first ad-hoc network, comprising:
- means for joining the ad-hoc network;
- means for receiving a synchronization message from the first ad-hoc network, the synchronization message indicating a first window schedule for the first ad-hoc network, the window schedule indicating a first timing reference for a first availability window during which communication occurs between nodes of the first ad-hoc network;
- means for receiving a synchronization message from a second ad-hoc network, the synchronization message indicating a second window schedule, the second window schedule providing a second timing reference for a second availability window during which communication occurs between nodes of the second ad-hoc network; and
- means for transmitting a discovery message on the first ad-hoc network, the discovery message indicating the second window schedule for the second ad-hoc network.

64. The apparatus of claim 63, further comprising means for determining a second window schedule for a third ad-hoc network, wherein the means for transmitting is configured to transmit the discovery message further indicating the second window schedule.

65. A non-transitory computer readable medium comprising instructions that when executed cause a processor to perform a method of wireless communication on a first ad-hoc network, the method comprising:
- joining the ad-hoc network; and
- receiving a synchronization message from the first ad-hoc network, the synchronization message indicating a first window schedule for the first ad-hoc network, the window schedule indicating a first timing reference for a first availability window during which communication occurs between nodes of the first ad-hoc network;
- receiving a synchronization message from a second ad-hoc network, the synchronization message indicating a second window schedule, the second window schedule providing a second timing reference for a second availability window during which communication occurs between nodes of the second ad-hoc network;
- transmitting a discovery message on the first ad-hoc network, the discovery message indicating the second window schedule for the second ad-hoc network.

66. The non-transitory computer readable medium of claim 65, the method further comprising determining a second window schedule for a third ad-hoc network, wherein the discovery message indicates the second window schedule.

* * * * *